US008386432B2

(12) United States Patent
Okada et al.

(10) Patent No.: US 8,386,432 B2
(45) Date of Patent: *Feb. 26, 2013

(54) BACKUP MANAGEMENT METHOD IN A REMOTE COPY ENVIRONMENT

(75) Inventors: Wataru Okada, Yokohama (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/137,098

(22) Filed: Jul. 20, 2011

(65) Prior Publication Data

US 2011/0283074 A1    Nov. 17, 2011

Related U.S. Application Data

(63) Continuation of application No. 12/155,208, filed on May 30, 2008, now Pat. No. 8,010,496.

(30) Foreign Application Priority Data

Mar. 25, 2008   (JP) ................................. 2008-077369

(51) Int. Cl.
*G06F 17/00* (2006.01)
(52) U.S. Cl. ......... 707/653; 707/610; 707/640; 707/661
(58) Field of Classification Search ........................ None
See application file for complete search history.

(56) References Cited

U.S. PATENT DOCUMENTS

| 5,544,347 | A | 8/1996 | Yanai et al. |
| 5,649,196 | A | 7/1997 | Woodhill et al. |
| 6,446,175 | B1 | 9/2002 | West et al. |
| 6,820,180 | B2 * | 11/2004 | McBrearty et al. ........... 711/162 |
| 6,985,901 | B1 | 1/2006 | Sachse et al. |
| 7,287,047 | B2 | 10/2007 | Kavuri |
| 7,406,488 | B2 | 7/2008 | Stager et al. |
| 7,464,239 | B2 | 12/2008 | Hwang et al. |
| 7,609,687 | B2 | 10/2009 | Kobayashi et al. |
| 7,734,594 | B2 | 6/2010 | Wang |
| 7,809,687 | B2 | 10/2010 | Cisler et al. |
| 7,827,136 | B1 * | 11/2010 | Wang et al. ................... 707/610 |

(Continued)

FOREIGN PATENT DOCUMENTS

| JP | 2003-242011 | 8/2003 |
| JP | 2005-190259 | 7/2005 |

(Continued)

OTHER PUBLICATIONS

Office Action issued in corresponding Japanese Patent Application No. 2008-077369, dated Apr. 10, 2012, pp. 1-9.

*Primary Examiner* — Hung Le
(74) *Attorney, Agent, or Firm* — Stites & Harbison, PLLC; Juan Carlos A. Marquez, Esq.; Nicholas B. Trenkle

(57) ABSTRACT

Provided is a computer system which is capable of backup operation with a minimum count of volumes in a remote copy environment when a disaster or the like causes a storage system to stop working normally. The computer system has a host computer, a first storage system, a second storage system, and a management computer. The first storage system contains a data volume which stores data requested by an application to be written. The second storage system contains a mirrored volume to which data stored in the data volume is copied. The computer system is characterized by being configured to receive an input of a policy about backup processing executed in backup volumes and set a configuration of the first storage system and a configuration of the second storage system under the received policy.

14 Claims, 22 Drawing Sheets

U.S. PATENT DOCUMENTS

| | | |
|---|---|---|
| 8,239,344 B2 * | 8/2012 | Hirakawa et al. .............. 707/613 |
| 2003/0131278 A1 | 7/2003 | Fujibayashi |
| 2005/0015407 A1 | 1/2005 | Nguyen et al. |
| 2005/0149577 A1 | 7/2005 | Okada et al. |
| 2005/0182910 A1 | 8/2005 | Stager et al. |
| 2006/0182020 A1 * | 8/2006 | Factor et al. .................. 370/220 |
| 2007/0050576 A1 | 3/2007 | Suzuki |
| 2007/0168362 A1 * | 7/2007 | Hirakawa et al. ............... 707/10 |
| 2007/0174690 A1 | 7/2007 | Kambara et al. |
| 2007/0283089 A1 * | 12/2007 | Tsurudome ................... 711/114 |
| 2008/0133695 A1 | 6/2008 | Suzuki et al. |
| 2009/0031320 A1 * | 1/2009 | Nakagawa et al. ........... 718/104 |
| 2011/0022814 A1 * | 1/2011 | Kottomtharayil et al. .... 711/170 |

FOREIGN PATENT DOCUMENTS

| | | |
|---|---|---|
| JP | 2006-163560 | 6/2006 |
| JP | 2007-065873 | 3/2007 |
| JP | 2007-183701 | 7/2007 |

* cited by examiner

| APPLICATION ID | STORAGE ID | VOLUME ID | HOST IP ADDRESS |
|---|---|---|---|
| AP1 | RAID1 | VOL01 | 192.168.0.2 |
| AP2 | RAID2 | VOL02 | 192.168.0.3 |
| ... | ... | ... | ... |

*FIG. 2*

| STORAGE ID | STORAGE IP ADDRESS |
|---|---|
| RAID1 | 192.168.1.2 |
| RAID2 | 192.168.1.3 |
| ... | ... |

| 4001 | 4002 | 4003 | 4004 | 4005 |
|---|---|---|---|---|
| REMOTE COPY ID | LOCAL STORAGE ID | DATA VOLUME ID | REMOTE STORAGE ID | MIRRORED VOLUME ID |
| RC1 | RAID1 | VOL01 | RAID2 | VOL01 |
| RC2 | RAID1 | VOL02 | RAID2 | VOL02 |
| ... | ... | ... | ... | ... |

| 5001 | 5002 | 5003 | 5004 |
|---|---|---|---|
| STORAGE ID | VOLUME ID | USE | CAPACITY |
| RAID1 | VOL01 | DATA VOLUME | 10G |
| RAID1 | VOL20 | UNUSED | 10G |
| ... | ... | ... | ... |

*FIG. 5*

| 6001 | 6002 | 6003 | 6004 | 6005 | 6006 |
|---|---|---|---|---|---|
| APPLICATION ID | RPO (BACKUP CYCLE) | BACKUP DATA RETENTION PERIOD | POLICY FOR FALL BACK OPERATION | BACKUP DATA OBTAINING STORAGE | LATEST BACKUP DATA HOLDING STORAGE ID |
| AP1 | ONE DAY | SIX DAYS | KEEP RPO | RAID1, RAID2 | RAID1 |
| AP2 | ONE DAY | THREE DAYS | KEEP BACKUP DATA RETENTION PERIOD | RAID1, RAID2 | RAID2 |
| ... | ... | ... | ... | ... | ... |

| APPLICATION ID | GENERATION ID | BACKUP SOURCE STORAGE ID | BACKUP SOURCE VOLUME ID | BACKUP DESTINATION STORAGE ID | BACKUP DESTINATION VOLUME ID | BACKUP DATA OBTAINED TIME | NORMAL/ REDUNDANT |
| --- | --- | --- | --- | --- | --- | --- | --- |
| AP1 | GENERATION 1 | RAID1 | VOL01 | RAID1 | VOL11 | 2008/1/1 12:00 | NORMAL |
| AP1 | GENERATION 2 | RAID2 | VOL02 | RAID2 | VOL12 | 2008/1/2 12:00 | NORMAL |
| ... | ... | ... | ... | ... | ... | ... | ... |

FIG. 7

BACKUP MANAGEMENT METHOD IN A REMOTE COPY ENVIRONMENT

CLAIM OF PRIORITY

This application is a Continuation of U.S. application Ser. No. 12/155,208 filed May 30, 2008 now U.S. Pat. No. 8,010, 496. Priority is claimed based on U.S. application Ser. No. 12/155,208 filed May 30, 2008, which claims priority from Japanese patent application 2008-77369 filed on Mar. 25, 2008, the content of which is hereby incorporated by reference into this application.

BACKGROUND

This invention relates to a technology for a computer system composed of a host computer, a storage system, and a management computer. More particularly, this invention relates to a technology of setting an environment for backing up data that is requested to be written by an application.

In a common computer system with a host computer, a storage system, which stores data requested to be written by the host computer in volumes, and a management computer, a loss of data stored in a volume may happen due to damage to the storage system from a disaster, a physical failure resulting from, for example, the expiration of the service life of a disk drive in the storage system, destruction of data stored in a volume by a computer virus, a user's wrong operation, and the like.

The computer system prepares for such data loss by periodically backing up data stored in the volumes so that the data can be restored if destroyed.

Data stored in a volume can be backed up by "local backup" in which a local copy function is used to back up the data to another volume in the storage system that has the volume to be backed up, or by "remote backup" in which the data in the volume to be backed up is copied (mirrored) by a remote copy function to a volume in another storage system, and then backed up by a local copy function within this other storage system.

Remote backup is capable of preventing data loss when data stored in a volume in one of storage systems is destroyed by a disaster or the like. Disasters include man-made disasters such as power failures and fires, and natural disasters such as earthquakes, eruptions, and typhoons.

With remote backup which stores backup data in another storage system far apart from the original storage system, when a disaster strikes the original storage system, the backup data stored in the other storage system which is not affected by the disaster is available for use. A user can thus avoid data loss from a disaster.

The site of a storage system that has a volume whose data is to be backed up is called a "local site" whereas the site of a storage system to which the data is backed up by remote backup is called a "remote site".

When a user's wrong operation or the like causes logical destruction of data and the task is to be resumed with the use of data stored on the remote site, the resumption of the task takes long because the data is restored by remote copy between storage systems.

A technology of speeding up restoration using remote backup is disclosed in JP 2003-242011 A. According to this technology, one or more generations of backup data is stored on the remote site and on the local site as well. In the case where data to be restored is found on the local site at the time of restoration, the data is restored by local copy. In the case where the data to be restored is found only on the remote site at the time of restoration, on the other hand, the data is restored by remote copy from the remote site.

SUMMARY

Generally speaking, damage to the user from a loss of data increases in proportion to the amount of the data lost. A backup environment (count of generations, in particular) is therefore set from the following two viewpoints.

The first viewpoint is the backup data retention period. In any backup environment, data older than the oldest backup data that is held in the computer system cannot be restored. With no way of restoration, data older than the oldest backup data might as well be totally lost.

Backup environments are therefore set such that backup data between the current time and a time n hours prior to the current time is always kept. The objective value "n hours prior" in keeping backup data between the current time and the time n hours prior to the current time is referred to as a "backup data retention period".

The second viewpoint is recovery point objective (RPO). When a failure occurs in a storage system, backup data obtained immediately before the failure is commonly restored.

Also in this case, data updated in a period from the time the failure occurs to the time the backup data preceding the failure is obtained is lost. Accordingly, with the lengthening of the interval between the time the failure occurs and the time the backup data preceding the failure is obtained, the amount of data lost increases and damage to the user increases as well.

Backup environments are therefore set such that data between the current time and a time m hours prior to the current time can be restored without fail as long as the time of failure is within the backup data retention period. The objective value "m hours prior" is referred to as "recovery point objective (RPO)". Usually, RPO determines the backup cycle.

How many generations are necessary for the backup operation is calculated from the first and second viewpoints. The necessary generation count is expressed as ROUNDUP ((backup data retention period)/(RPO))+1. ROUNDUP(X) represents a function for obtaining the smallest integer equal to or greater than X by rounding up fractions of X.

This means that, when the backup data retention period is constant, a smaller RPO (shorter backup cycle) requires more generations of backup data. When RPO is constant, a longer backup data retention period requires more generations of backup data.

In JP 2003-242011 A, the remote site stores as many generations of backup data as requested by the user, and the local site stores as many generations of backup data as requested by the user.

When the count of generations of backup data stored on the local site is set small, a disaster on the remote site means only a few generations of backup data stored in the entire computer system. In other words, a disaster on the remote site degrades at least one of the RPO and backup data retention period of backup data stored in the entire computer system. If the computer system is to continue the backup operation after the disaster, the backup operation is performed with at least one of the RPO and the backup data retention period degraded.

For instance, when remote backup is executed with the RPO set to one day and the backup data retention period to six days (i.e., the count of necessary generations is seven) to store only one latest generation of backup data on the local site, a disaster on the remote site means only immediate past backup data stored on the local site. Then the backup data retention period is zero day despite the RPO of backup data stored in the entire computer system being one day and, if the task is to continue after the disaster, the backup operation has to be performed with the RPO fixed to one day and the backup data retention period fixed to zero day.

On the other hand, setting a backup environment in the configuration of JP 2003-242011 such that the local site and the remote site hold the same count of generations of backup data requires the local site to have as many volumes as the remote site, and thus increases the cost.

It is therefore an object of this invention to provide a computer system: which employs a uniform backup policy in keeping backup data between sites where backup operation is performed through remote copy in a manner that reduces the degradation of the backup data retention period and of the RPO immediately after a disaster whichever site is struck by the disaster; which is capable of performing backup operation in a manner that reduces the degradation of the backup data retention period and of the RPO after a disaster; and which sets a backup environment that minimizes the cost by eliminating any unnecessary redundancy operation to each storage system in performing backup operation.

According to an aspect of the present invention, there is provided a computer system, comprising: a host computer which has a first processor, a memory, and a first interface, the first processor performing computing, the memory being coupled to the first processor and storing an application program which performs a task, the first interface being coupled to the first processor; a first storage system which has a second processor, a first storage device, and a second interface, the second processor performing computing, the first storage device including a data volume which stores data requested by the application program to be written, the second interface being coupled to the second processor; at least one second storage system which has a third processor, a second storage device, and a third interface, the third processor performing computing, the second storage device including a mirrored volume which stores a copy of the data stored in the data volume, the third interface being coupled to the third processor; and a management computer which has a fourth processor, a memory, and a fourth interface, the fourth processor performing computing, the memory being coupled to the fourth processor, the fourth interface being coupled to the fourth processor, wherein the first storage device includes a plurality of backup volumes where backup processing for copying the data stored in the data volume is executed, wherein the second storage device includes a plurality of backup volumes where backup processing for copying the data stored in the mirrored volume is executed, and wherein the management computer is configured to: receive an input of a policy about the backup processing executed in the backup volumes; set a configuration of the first storage device and a configuration of the second storage device under the received policy; and execute the backup processing in the plurality of backup volumes included in the first storage device and the plurality of backup volumes included in the second storage device according to the set configuration of the first storage device and the set configuration of the second storage device.

According to a mode of this invention, the degradation of the backup data retention period and of the RPO can be minimized in a remote copy environment when a disaster or the like causes a storage system to stop working normally. The cost can be minimized as well since the backup operation requires a minimum count of volumes.

BRIEF DESCRIPTION OF THE DRAWINGS

The present invention can be appreciated by the description which follows in conjunction with the following figures, wherein:

FIG. 2 is an explanatory diagram of an application management table according to the first embodiment of this invention;

FIG. 3 is an explanatory diagram of a storage management table according to the first embodiment of this invention;

FIG. 4 is an explanatory diagram of a remote copy management table according to the first embodiment of this invention;

FIG. 5 is an explanatory diagram of a volume management table according to the first embodiment of this invention;

FIG. 6 is an explanatory diagram of a backup policy management table according to the first embodiment of this invention;

FIG. 7 is an explanatory diagram of a backup data management table according to the first embodiment of this invention;

DETAILED DESCRIPTION OF THE PREFERRED EMBODIMENTS

Embodiments of this invention will be described below with reference to FIGS. 1 to 21.

First Embodiment

A first embodiment will be described first with reference to FIGS. 1 to 17.

A computer system according to this embodiment includes storage systems with a backup function that uses a local copy function and a remote copy function. The local copy function is a function of copying data between data volumes within a single storage system. The remote copy function is a function of copying data stored in a data volume within one storage system to a data volume within another storage system. In this embodiment, the remote backup refers to backing up, with the use of a local copy function, a data volume on the remote site that has been copied (mirrored) by remote copy.

Figure 1:
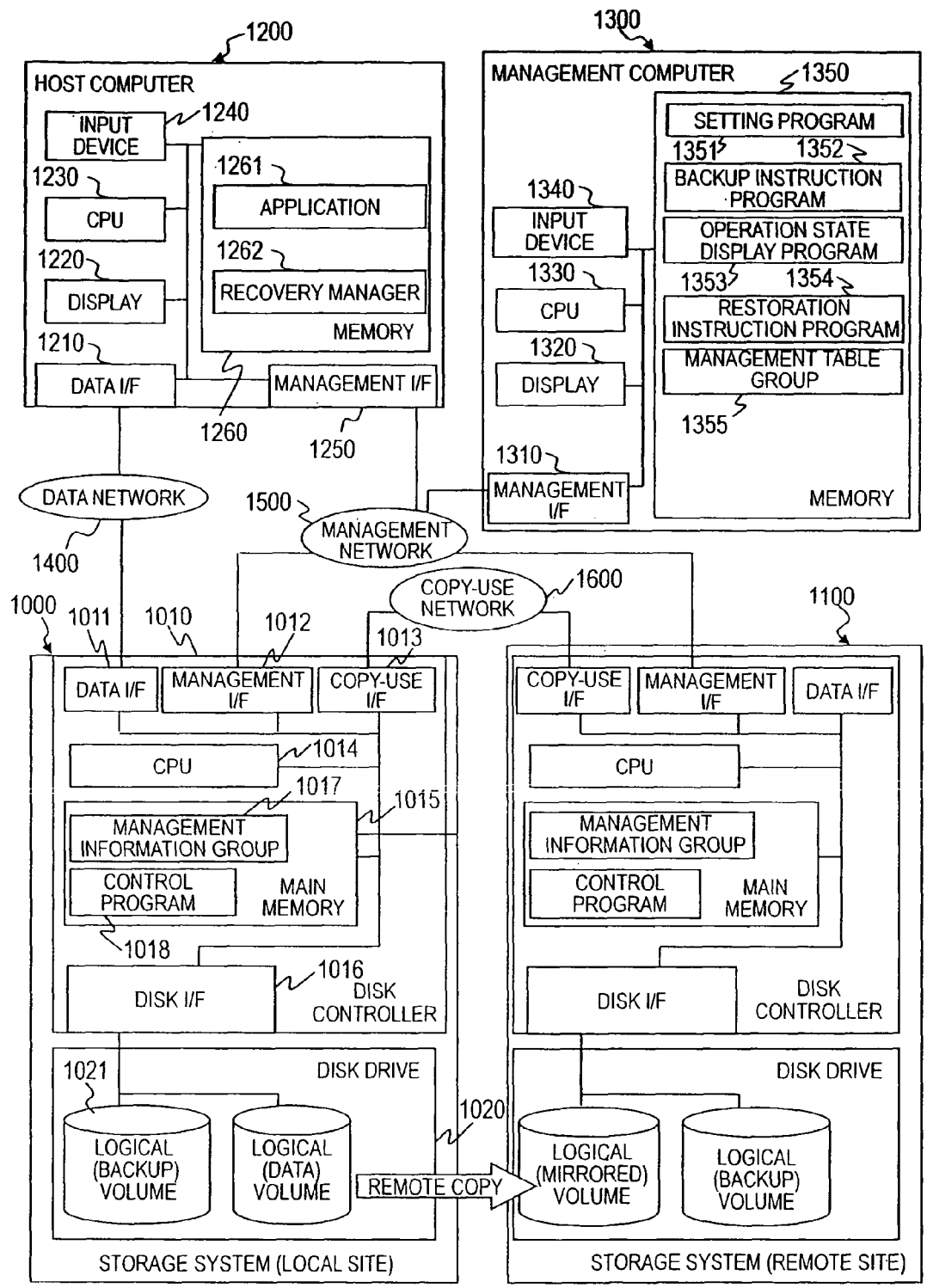
FIG. 1 is a block diagram showing a configuration of a computer system according to a first embodiment of this invention.

The configuration of a computer system 100 according to the first embodiment of this invention will be described with reference to FIG. 1. FIG. 1 is a block diagram showing the configuration of the computer system 100 according to the first embodiment of this invention.

The computer system 100 has storage systems 1000 and 1100, at least one host computer 1200, and a management computer 1300.

The storage system 1000 and the host computer 1200 are coupled to each other via a data network 1400. The data network 1400 is, for example, a storage area network (SAN). The data network 1400 may also be an IP network or the like as long as it is a network for data communication.

The storage systems 1000 and 1100, the host computer 1200, and the management computer 1300 are coupled to one another via a management network 1500. The management network 1500 is, for example, an IP network. The management network 1500 may also be a storage area network or the like as long as it is a network for data communication.

Further, the storage systems 1000 and 1100 are coupled to each other via a copy-use network 1600. The copy-use network 1600 is, for example, an IP network. The copy-use network 1600 may also be a storage area network or the like as long as it is a network for data communication.

Further, the data network 1400, the management network 1500, and the copy-use network 1600 may be the same network.

The storage systems 1000 and 1100 and the management computer 1300 are each installed in one housing, but may be installed in two or more housings.

The storage system 1000 will be described first.

The storage system 1000 contains volumes where data used by applications 1261 executed by the host computer 1200 is stored.

The storage system 1000 has a disk drive 1020 which stores data and a disk controller 1010 which handles the overall control of the storage system 1000.

The disk drive 1020 is disk type storage, for example, a hard disk drive. Other various types of storage than a hard disk drive, including a flash memory device, can also serve as the disk drive 1020.

A plurality of logical volumes 1021 which are logical storage areas are formed in the storage area of the disk drive 1020. The use of the logical volumes 1021 is varied to meet requests of the user. In this embodiment, the logical volumes 1021 having different uses are given different names.

Specifically, the logical volume 1021 that stores data used by one of the applications 1261 executed by the host computer 1200 is referred to as "data volume". The logical volume 1021 to which data stored in a data volume is copied with the use of the remote copy function is referred to as "mirrored volume". The logical volume 1021 to which data stored in a data volume or a mirrored volume is copied with the use of the local copy function is referred to as "backup volume".

The disk controller 1010 has a data interface (I/F) 1011, a management interface (I/F) 1012, a disk interface (I/F) 1016, a copy-use interface (I/F) 1013, a CPU 1014, and a main memory 1015.

The main memory 1015 stores a management information group 1017 and a control program 1018.

The CPU 1014 executes a program stored in the main memory 1015. When a computer program is written as the executor of processing in the following description, it is actually a CPU running the computer program that executes the processing.

Run by the CPU 1014, the control program 1018 executes processing for implementing at least one of the local copy function and the remote copy function. The control program 1018 contains at least a local copy program which implements the local copy function and a remote copy program which implements the remote copy function.

The control program 1018 inputs/outputs data to/from the disk drive 1020 in response to an input/output request made by the host computer 1200 or the management computer 1300. The control program 1018 also sets configuration information or control information within the storage system 1000 in response to a request made by the host computer 1200 or the management computer 1300.

The configuration information contains information that indicates the relation between the a plurality of logical volumes 1021. The information indicating the relation between the plurality of logical volumes 1021 contains information that indicates the types of the logical volumes 1021, information that indicates which backup volume is associated with which data volume, and information that indicates which mirrored volume is associated with which data volume.

The configuration information is included in the management information group 1017, and recorded in the main memory 1015. The control program 1018 executes various types of processing while referring to or updating the configuration information included in the management information group 1017.

The data I/F 1011 is an interface that couples the storage system 1000 to the data network 1400. The data I/F 1011 has one or more communication ports. The disk controller 1010 communicates data and control commands to and from the host computer 1200 and another storage system 1000 via the port(s) included in the data I/F 1011.

The management I/F 1012 is an interface that couples the storage system 1000 to the management network 1500. The disk controller 1010 communicates data and control commands to and from the host computer 1200 and the management computer 1300 via the management I/F 1012.

The copy-use I/F 1013 is an interface that couples the storage system 1000 to the copy-use network 1600. The disk controller 1010 communicates data and control commands that are relevant to remote copy to and from the storage system 1100, which is coupled to the storage system 1000 through the copy-use network 1600, via the copy-use I/F 1013.

The disk I/F 1016 is an interface that couples the disk controller 1010 to the disk drive 1020. The disk controller 1010 communicates data and control commands to and from the disk drive 1020 via the disk I/F 1016.

The configuration of the storage system 1100 is the same as that of the storage system 1000, and its description will be omitted. One of the logical volumes 1021 stored in the storage system 1100 is a mirrored volume to which data stored in a data volume of the storage system 1000 is copied with the use of the remote copy function.

In the description of the first to third embodiments of this invention, "storage system" is the collective term for the storage systems 1000 and 1100.

The host computer 1200 has an input device 1240 which includes a keyboard, a mouse, and the like, a CPU 1230, a display 1220 such as an LCD or a CRT, a memory 1260, a data I/F 1210, and a management I/F 1250.

The data I/F 1210 is an interface that couples the host computer 1200 to the data network 1400. The data I/F 1210 has one or more communication ports. The host computer 1200 communicates data and control commands to and from the storage system 1000 via the port(s) included in the data I/F 1210.

The management I/F 1250 is an interface that couples the host computer 1200 to the management network 1500. The host computer 1200 communicates data for managing the computer system and control commands for managing the computer system to and from the management computer 1300 and the storage system 1000 via the management I/F 1250.

The memory 1260 stores the applications 1261 and a recovery manager 1262. The CPU 1230 implements various functions by executing programs that the memory 1260 stores.

The applications 1261 are programs that use the logical volumes 1021 that serve as data volumes. Specifically, data requested by the applications 1261 to be written is stored in data volumes. The applications 1261 are, for example, database management systems (DBMSs) or file systems.

The recovery manager 1262 is a program for controlling the operation of the applications 1261 in taking a backup of data stored in the logical volumes 1021 and in restoring data stored in the logical volumes 1021.

Specifically, the recovery manager 1262 freezes the operation of the relevant application 1261 when a backup of data stored in one of the logical volumes 1021 is to be taken. The recovery manager 1262 thus ensures that data stored in the data volume used by the application 1261 is backed up to a backup volume.

The recovery manager 1262 also stops the operation of the relevant application 1261 when data stored in one of the logical volumes 1021 is to be restored.

The recovery manager 1262 also collects data necessary to back up data stored in the logical volumes 1021 or to restore data stored in the logical volumes 1021 from the host computer 1200 in response to a request made by a setting program 1351 of the management computer 1300.

Data of the host computer 1200 collected by the recovery manager 1262 is, for example, information for identifying which logical volume 1021 is used by which application 1261. This data of the host computer 1200 is obtained by a configuration file or the like of each application 1261. For instance, when the application 1261 is a Linux file system, the configuration file that collects the data of the host computer 1200 is a "/etc/fstab" file or the like.

The management computer 1300 has an input device 1340 which includes a keyboard, a mouse, a CPU 1330, a display 1320 such as an LCD or a CRT, a memory 1350, and a management I/F 1310.

The management I/F 1310 is an interface that couples the management computer 1300 to the management network 1500. The management computer 1300 communicates data for managing the computer system and control commands for managing the computer system to and from the host computer 1200 and the storage systems 1000 and 1100 via the management I/F 1310.

The memory 1350 stores the setting program 1351, a backup instruction program 1352, an operation state display program 1353, a restoration instruction program 1354, and a management table group 1355. The CPU 1330 implements various functions by executing programs that the memory 1350 stores.

Figure 9:
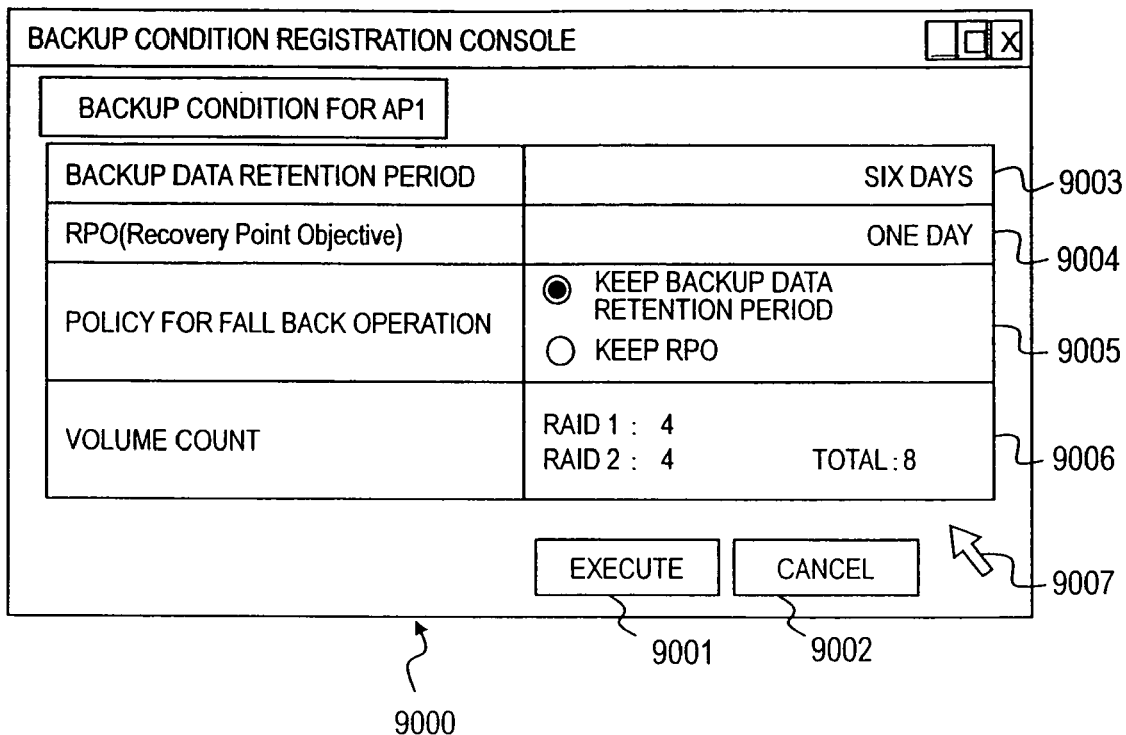
FIG. 9 is an explanatory diagram of a backup condition registration console according to the first embodiment of this invention.

The setting program 1351 is a program that sets a backup environment in the computer system. The user enters a policy about backup through a backup condition registration console 9000, which is an interface provided by the setting program 1351 and which is shown in FIG. 9. Backup policies entered by the user will be described in detail with reference to FIG. 9.

The backup policy entered by the user is sent over the management network 1500 to the control programs 1018 of the storage systems 1000 and 1100. The backup policy received by the storage systems 1000 and 1100 is recorded in their respective main memories 1015 as the management information group 1029.

The backup instruction program 1352 is a program that performs backup operation based on the management table group 1355 which is set by the setting program 1351. The backup instruction program 1352 updates information registered in the management table group 1355 each time data stored in one of the logical volumes 1021 is backed up. Details of the processing of the backup instruction program 1352 will be described with reference to FIG. 10.

The operation state display program 1353 is a program that displays a backup data retention state display console. The backup data retention state display console shows the retention state of backup data which is created through backup operation performed by the backup instruction program 1352. Details of the backup data retention state display console will be described with reference to FIG. 14. Details of the processing of the operation state display program 1353 will be described with reference to FIG. 13.

The restoration instruction program 1354 is a program that restores data from backup data created through backup operation which is performed by the backup instruction program 1352. Details of the processing of the restoration instruction program 1354 will be described with reference to FIG. 15.

The management table group 1355 is a group of tables in which information for performing backup operation is registered. The management table group 1355 includes an application management table 2000, a storage management table 3000, a remote copy management table 4000, a volume management table 5000, a backup policy management table 6000, and a backup data management table 7000. Details of the application management table 2000 will be described with reference to FIG. 2. Details of the storage management table 3000 will be described with reference to FIG. 3. Details of the remote copy management table 4000 will be described with reference to FIG. 4. Details of the volume management table 5000 will be described with reference to FIG. 5. Details of the backup policy management table 6000 will be described with reference to FIG. 6. Details of the backup data management table 7000 will be described with reference to FIG. 7.

The tables included in the management table group 1355 will be described next with reference to FIGS. 2 to 7.

FIG. 2 is an explanatory diagram of the application management table 2000 according to the first embodiment of this invention.

The application management table 2000 is a table that is used to manage the relation between the applications 1261 executed by the host computer 1200 managed by the management computer 1300 and the logical volumes 1201 (data volumes) that are used by the applications 1261.

The application management table 2000 contains in each entry an application ID 2001, a storage ID 2002, a volume ID 2003, and a host IP address 2004.

Registered as the application ID 2001 is an identifier unique to each application 1261 executed by the host computer 1200 managed by the management computer 1300.

Registered as the storage ID 2002 is an identifier unique to the storage system 1000 where a data volume used by the application 1261 that is identified by the application ID 2001 is located.

Registered as the volume ID 2003 is an identifier unique to the data volume used by the application 1261 that is identified by the application ID 2001.

Registered as the host IP address 2004 is a network address that is assigned to the management I/F 1250 of the host computer 1200 executing the application 1261 that is identified by the application ID 2001.

In the case where one application 1261 uses a plurality of data volumes, identifiers unique to a plurality of data volumes that are used by the application 1261 are registered as the volume ID 2003. The identifiers of a plurality of logical volumes 1021 can be registered in the form of a list in a field for the volume ID 2003.

The following describes how values are registered in the respective fields of the application management table 2000.

The user enters the identifier of one application 1261 and the network address of the management I/F 1250 of the host computer 1200 via a user interface provided by the setting program 1351 (for example, a graphic user interface (GUI)). The entered application identifier and network address are registered as the application ID 2001 and the host IP address 2004, respectively.

When the user enters the identifier of the application 1261 and the network address of the management I/F 1250 via the user interface provided by the setting program 1351, the setting program 1351 uses the entered network address of the management I/F 1250 to communicate with the recovery manager 1262 of the host computer 1200 that has this management I/F 1250.

The setting program 1351 then obtains the identifier of a data volume that is used by the application 1261 identified by the entered application identifier and the identifier of the storage system 1000 having this data volume.

The setting program 1351 registers the obtained data volume identifier as the volume ID 2003 and the obtained identifier of the storage system 1000 as the storage ID 2002.

A network address registered as the host IP address 2004 is used by various programs in data communication with the recovery manager 1262 of the host computer 1200. However, mention of this fact will be omitted from the following description.

FIG. 3 is an explanatory diagram of the storage management table 3000 according to the first embodiment of this invention.

The storage management table 3000 is a table that shows the network addresses of storage systems managed by the management computer 1300.

The storage management table 3000 contains in each entry a storage ID 3001 and a storage IP address 3002.

Registered as the storage ID 3001 is an identifier unique to each storage system coupled to the management computer 1300.

Registered as the storage IP address 3002 is a network address that is assigned to the management I/F 1012 of a storage system identified by a storage system ID that is registered as the storage ID 3001.

The user enters the identifier of one storage system and the network address of the management I/F 1012 of this storage system via the user interface provided by the setting program 1351. The entered storage system identifier and network address are registered as the storage ID 3001 and the storage IP address 3002, respectively.

FIG. 4 is an explanatory diagram of the remote copy management table 4000 according to the first embodiment of this invention.

The remote copy management table 4000 is a table in which the remote copy pair relation is registered. A remote copy pair consists of a data volume and a mirrored volume to which data stored in the data volume is copied with the use of the remote copy function.

The remote copy management table 4000 contains in each entry a remote copy ID 4001, a local storage ID 4002, a data volume ID 4003, a remote storage ID 4004, and a mirrored volume ID 4005.

Registered as the remote copy ID 4001 is an identifier unique to a currently set remote copy pair.

Registered as the local storage ID 4002 is an identifier unique to a storage system containing the logical volume 1021 (data volume) that stores original data as the copy source of this remote copy pair. Registered as the data volume ID 4003 is an identifier unique to the logical volume 1021 (data volume) that stores original data as the copy source of this remote copy pair.

Registered as the remote storage ID 4004 is an identifier unique to a storage system containing the logical volume 1021 (mirrored volume) that serves as the copy destination of this remote copy pair. Registered as the mirrored volume ID 4005 is an identifier unique to the logical volume 1021 (mirrored volume) that serves as the copy destination of this remote copy pair.

Data obtained by the setting program 1351 from the control program 1018 of each storage system is registered in the respective fields of the remote copy management table 4000.

The setting program 1351 uses the network address of the management I/F 1012 of a storage system that is registered as the storage IP address 3002 in the storage management table 3000 shown in FIG. 3 to communicate with the control program 1018 of this storage system. A network address registered as the storage IP address 3002 is used by various programs in data communication with the control program 1018 of a storage system. However, mention of this fact is omitted from the following description.

FIG. 5 is an explanatory diagram of the volume management table 5000 according to the first embodiment of this invention.

The volume management table 5000 is a table that is used to manage information about the logical volumes 1021 in storage systems managed by the management computer 1300.

The volume management table 5000 contains in each entry a storage ID 5001, a volume ID 5002, a use 5003, and a capacity 5004.

Registered as the storage ID 5001 is an identifier unique to each storage system. Registered as the volume ID 5002 is an identifier unique to each logical volume 1021.

Registered as the use 5003 is information that indicates the use of the logical volume 1021 that is identified by an identifier unique to the storage system, which is registered as the storage ID 5001, and by an identifier unique to the logical volume 1021, which is registered as the volume ID 5002.

Specifically, in the case where the logical volume 1021 in question is a data volume for storing data that is used by an application, "data volume" is registered as the use 5003. In the case where the logical volume 1021 in question is a mirrored volume to which data stored in a data volume is copied by the remote copy function, "mirrored volume" is registered as the use 5003. In the case where the logical volume 1021 in question is a backup volume to which data stored in a data volume or a mirrored volume is copied by the local copy function, "backup volume" is registered as the use 5003. In the case where the logical volume 1021 in question is not in use, "unused" is registered as the use 5003.

Registered as the capacity 5004 is information that indicates the capacity of the logical volume 1021 that is identified by an identifier unique to the storage system, which is registered as the storage ID 5001, and by an identifier unique to the logical volume 1021, which is registered as the volume ID 5002.

Data obtained by the setting program 1351 from the control program 1018 of each storage system is registered in the respective fields of the remote copy management table 4000.

FIG. 6 is an explanatory diagram of the backup policy management table 6000 according to the first embodiment of this invention.

The backup policy management table 6000 is a table that is used to manage various policies applied when data that is stored in data volumes used by the applications 1261 is backed up by the local copy function.

The backup policy management table 6000 contains in each entry an application ID 6001, a recovery point objective (RPO) (backup cycle) 6002, a backup data retention period 6003, a policy for fall back operation 6004, backup data obtaining storage 6005, and a latest backup data holding storage ID 6006.

Registered as the application ID 6001 is an identifier unique to each application 1261 executed by the host computer 1200 which is managed by the management computer 1300.

Registered as the RPO 6002 is information that indicates when to execute backup processing for copying data from a data volume used by the application 1261 that is identified by the application ID 6001 (or mirrored volume to which data stored in the data volume is copied) to a backup volume with the use of the local copy function.

Registered as the backup data retention period 6003 is information that indicates how long data copied from a data volume used by the application 1261 that is identified by the application ID 6001 should be stored in a backup volume.

Registered as the policy for fall back operation 6004 is information that indicates a policy for fall back operation. Fall back operation is performed when there is trouble in at least one of the storage system 1000 (local site storage system) where a data volume used by one application 1261 is located and the storage system 1100 (remote site storage system) where a mirrored volume to which data is copied from the data volume by the remote copy function is located, in order to take a backup of data stored in the data volume used by the application 1261 (hereinafter, referred to as fall back operation).

Specifically, "keep RPO" or "keep backup data retention period" is registered as the policy for fall back operation 6004. "Keep RPO" is information indicating that, in fall back operation, the back up instruction program 1352 should take a backup of data stored in the data volume used by the application 1261 in a manner that maintains an RPO registered as the RPO 6002 while sacrificing the backup data retention period. "Keep backup data retention period" is information indicating that, in fall back operation, the back up instruction program 1352 should take a backup of data stored in the data volume used by the application 1261 in a manner that maintains a backup data retention period registered as the backup retention period 6003 while sacrificing the RPO.

In short, processing executed by the backup instruction program 1352 in fall back operation varies depending on what information is registered as the policy for fall back operation 6004. Specific processing executed by the backup instruction program 1352 will be described in detail with reference to FIG. 10.

Registered as the backup data obtaining storage 6005 are an identifier unique to a storage system that has a copy source data volume and an identifier unique to a storage system that has a copy destination mirrored volume when data stored in a data volume used by the application 1261 that is identified by the application ID 6001 is backed up by the remote copy function.

Registered as the latest backup data holding storage ID 6006 is an identifier unique to a storage system that stores the latest backup data of data stored in a data volume used by the application 1261 that is identified by the application ID 6001.

The user enters an identifier unique to one application 1261 through the user interface (GUI, for example) provided by the setting program 1351. The entered application identifier is registered as the application ID 6001.

The user enters information indicating an RPO, information indicating a backup data retention period, and information indicating a policy for fall back operation through the backup condition registration console 9000, which is provided by the setting program 1351 and shown in FIG. 9. The entered information is registered as the RPO 6002, the backup data retention period 6003, and the policy for fall back operation 6004.

The setting program 1351 registers unique storage system identifiers as the backup data obtaining storage 6005. Details thereof will be described with reference to FIG. 8.

The backup instruction program 1352 registers a unique storage system identifier as the latest backup data holding storage ID 6006. Details thereof will be described with reference to FIG. 10.

FIG. 7 is an explanatory diagram of the backup data management table 7000 according to the first embodiment of this invention.

The backup data management table 7000 is a table that is used to manage the backup state of data stored in data volumes which are used by the applications 1261.

The backup data management table 7000 contains in each entry an application ID 7001, a generation ID 7002, a backup source storage ID 7003, a backup source volume ID 7004, a backup destination storage ID 7005, a backup destination volume ID 7006, a backup data obtained time 7007, and a normal/redundant flag 7008.

Registered as the application ID 7001 is an identifier unique to each application 1261.

Registered as the generation ID 7002 is a unique generation identifier which is assigned to each backup volume storing a backup of data.

Registered as the backup source storage ID 7003 is an identifier unique to a storage system that has the logical volume 1021 from which data is backed up, creating backup data of a generation that is indicated by the generation ID 7002. Registered as the backup source volume ID 7004 is an identifier unique to the logical volume 1021 from which data is backed up, creating backup data of a generation that is indicated by the generation ID 7002.

Registered as the backup destination storage ID 7005 is an identifier unique to a storage system that has the logical volume 1021 where backup data of a generation that is indicated by the generation ID 7002 is located. Registered as the backup destination volume ID 7006 is an identifier unique to the logical volume 1021 where backup data of a generation that is indicated by the generation ID 7002 is located.

Registered as the backup data obtained time 7007 is information that indicates the date and time when data of a generation identified by the generation ID 7002 is backed up. Registered as the normal/redundant flag 7008 is "normal", a value indicating that data of a generation identified by the generation ID 7002 is normal data of which no copy exists in the computer system, or "redundant", a value indicating that data of a generation identified by the generation ID 7002 is redundant data of which a plurality of copies exist in the computer system. In some cases, no value is registered in a field for the normal/redundant flag 7008.

The application ID 7001, the generation ID 7002, the backup source storage ID 7003, the backup source volume ID 7004, the backup destination storage ID 7005, and the backup destination volume ID 7006 are set by the setting program 1351. The backup data obtained time 7007 and the normal/redundant flag 7008 are set by the backup instruction program 1352. Details of the processing of the backup instruction program 1352 are described with reference to FIG. 10.

Figure 8:
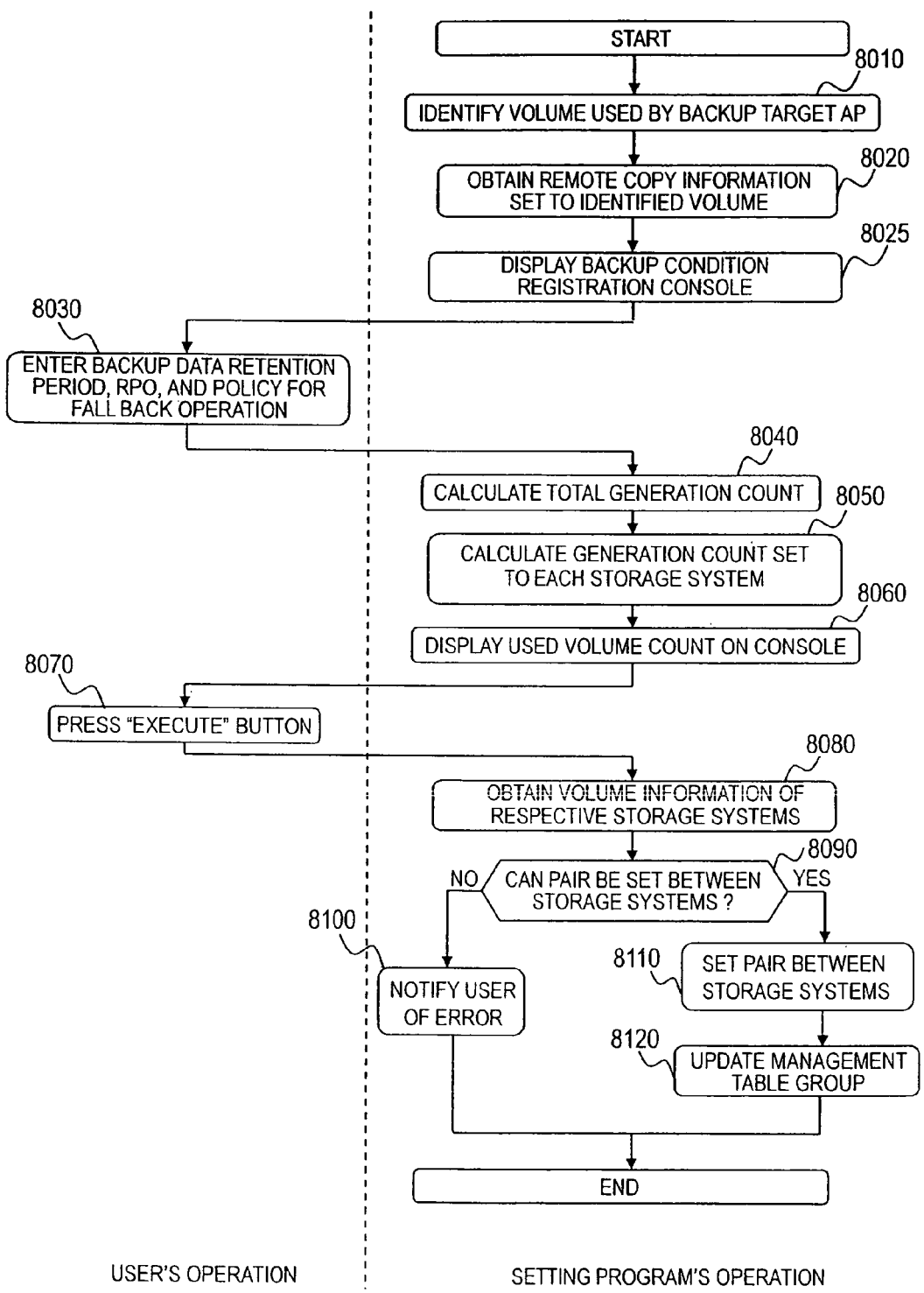
FIG. 8 is a flow chart of a backup environment setting processing executed by a setting program according to the first embodiment of this invention.

Backup environment setting processing by the setting program 1351 is described next with reference to FIG. 8. FIG. 8 is a flow chart of the backup environment setting processing executed by the setting program 1351 according to the first embodiment of this invention.

The user specifies for which application 1261 a backup environment is to be set, thereby causing the setting program 1351 to start the backup environment setting processing.

First, the setting program 1351 refers to the application management table 2000 shown in FIG. 2 to identify which logical volume 1021 (data volume) is used by the specified application 1261 (8010).

Specifically, the setting program 1351 chooses from the application management table 2000 an entry whose application ID 2001 matches the unique identifier of the specified application 1261.

The setting program 1351 extracts from the chosen entry an identifier of the storage system, which is registered as the storage ID 2002, and an identifier of the logical volume 1021, which is registered as the volume ID 2003, thus identifying the logical volume 1021 that is used by the specified application 1261.

The setting program 1351 next refers to the remote copy management table 4000 shown in FIG. 4 and obtains information about remote copy of the logical volume 1021 identified in Step 8010 to identify a mirrored volume of the logical volume 1021 identified in Step 8010 and a storage system that has this mirrored volume (8020).

The storage system that has the data volume identified in Step 8010 and the storage system that has the mirrored volume identified in Step 8020 are storage systems where data stored in the data volume is to be backed up.

Specifically, the setting program 1351 selects from the remote copy management table 4000 entries whose local storage ID 4002 matches the storage system identifier obtained in Step 8010.

From among the selected entries, the setting program 1351 chooses an entry whose data volume ID 4003 matches the logical volume identifier obtained in Step 8010.

The setting program 1351 extracts from the chosen entry an identifier of the storage system, which is registered as the remote storage ID 4004, and an identifier of the logical volume 1021, which is registered as the mirrored volume ID 4005, thus identifying the mirrored volume of the logical volume 1021 that is obtained in Step 8010 and the storage system that has this mirrored volume.

Alternatively, in Step 8020, the setting program 1351 may obtain information to be registered in entries of the remote copy management table 4000 shown in FIG. 4 from the control program 1018 to update the remote copy management table 4000 with the obtained information.

The setting program 1351 next causes the display 1320 to display the backup condition registration console 9000 shown in FIG. 9 that reflects the identifier of the storage system identified in Step 8010 and the identifier of the storage system obtained in Step 8020 (8025).

The user enters a backup data retention period, an RPO, and a policy for fall back operation through the backup condition registration console 9000 displayed in Step 8025 (8030).

Receiving the input from the user, the setting program 1351 calculates Expression 1 from the entered backup data retention period and RPO to obtain the backup generation count (8040).

Backup generation count=ROUNDUP(backup data retention period/RPO)+1     (Expression 1)

ROUNDUP (X) is a function that rounds up fractions of X

For instance, when the entered backup data retention period and RPO are six days and one day, respectively, the setting program 1351 obtains seven as the backup generation count by calculating ROUNDUP (6/1)+1.

When the backup generation count is seven, backup data of six days ago can be kept while data is deleted from one of the backup volumes that stores the oldest data in order to back up the latest data that is stored in the data volume to this backup volume. Data present within the computer system in this case includes, as the backup data, data that is currently backed up, data of yesterday, data of two days ago, data of three days ago, data of four days ago, data of five days ago, and data of six days ago.

The setting program 1351 next calculates Expression 2 to obtain a local copy pair generation count which is set to each storage system managed by the management computer 1300 (8050). The local copy pair generation count is the count of backup volumes which are set in each storage system to store data copied by backup processing.

Local copy pair generation count=ROUNDUP(backup generation count/storage system count) (Expression 2)

For instance, when the backup generation count is seven and the storage system count is two, the setting program 1351 obtains four as the local copy pair generation count by calculating ROUNDUP (7/2).

The setting program 1351 then displays the backup condition registration console 9000, again with the local copy pair generation count calculated in Step 8050 as a used volume count (8060).

To authorize the used volume count displayed on the backup condition registration console 9000, the user operates an "execute" button on the backup condition registration console 9000 (8070).

When the user operates the "execute" button in Step 8070, the setting program 1351 refers to the volume management table 5000 shown in FIG. 5 to obtain information about the logical volumes 1021 located in the backup data obtaining storage systems (8080).

Specifically, the setting program 1351 selects from the volume management table 5000 any entry whose storage ID 5001 matches the identifier of one of the backup data obtaining storage systems.

From each of the selected entries, the setting program 1351 extracts all of information registered as the volume use 5003 and information registered as the volume capacity 5004, thereby obtaining information about the logical volumes 1021 located in the backup data obtaining storage systems.

Alternatively, before executing Step 8080, the setting program 1351 may communicate with the control programs 1018 of the relevant storage systems to obtain information to be registered in the volume management table 5000 and update the volume management table 5000 with the obtained information.

The setting program 1351 next judges whether or not the storage systems have as many logical volumes 1021 as the used volume count (8090).

Specifically, the setting program 1351 judges whether or not, out of the logical volumes 1021 located in the backup data obtaining storage systems, the count of the logical volumes 1021 that have "unused" as the use 5003 obtained in Step 8080 and a capacity larger than necessary to store backup data as the capacity 5004 obtained in Step 8080 is equal to or higher than the used volume count.

When it is judged in Step 8090 that the storage systems do not have as many logical volumes 1021 as the used volume count, the setting program 1351 notifies the user of the fact that backup volumes cannot be set up in the storage systems by displaying an error message on the display 1320 (8100), and ends the backup environment setting processing.

When it is judged in Step 8090 that the storage systems have as many logical volumes 1021 as the used volume count, on the other hand, the setting program 1351 sends a command to set the logical volumes 1021 in the storage systems as backup volumes to the control programs 1018 of the backup data obtaining storage systems (8110).

The setting program 1351 then updates the management table group (8120), and ends the backup environment setting processing.

Specifically, the setting program 1351 updates the use 5003 to "backup volume" in entries of the volume management table 5000 shown in FIG. 5 for the logical volumes 1021 that are set as backup volumes in Step 8110.

The setting program 1351 assigns generation identifiers to the backup volumes set in Step 8110. The setting program 1351 then selects every entry in the backup data management table 7000 shown in FIG. 7 whose application ID 7001 matches the identifier of the application 1261 that has been entered by the user.

From among the selected entries, the setting program 1351 chooses an entry whose generation ID 7002 matches any assigned generation identifier.

The setting program 1351 updates the chosen entry by overwriting the backup source storage ID 7003 with the identifier of a storage system that has the logical volume 1021 to be backed up (data volume or mirrored volume) and by overwriting the backup source volume ID 7004 with the identifier of the logical volume 1021 to be backed up (data volume or mirrored volume).

The setting program 1351 updates the chosen entry also by overwriting the backup destination storage ID 7005 with the identifier of a storage system that has a backup volume to which the generation identifier in question is assigned and by overwriting the backup destination volume ID 7006 with the identifier of the backup volume to which the generation identifier in question is assigned.

The setting program 1351 updates an entry in the backup policy management table 6000 shown in FIG. 6 for the application 1261 that has been specified by the user by overwriting the RPO 6002, the backup data retention period 6003, and the policy for fall back operation 6004 with the RPO, backup data retention period, and policy for fall back operation entered by the user in Step 8030 through the backup condition registration console 9000.

The setting program 1351 updates the entry in the backup policy management table 6000 shown in FIG. 6 for the application 1261 that has been specified by the user also by overwriting the backup data obtaining storage 6005 with the storage system identified in Step 8020.

The setting program 1351 interrupts the backup environment setting processing in the case where the user presses a "cancel" button 9002 on the backup condition registration console 9000 as shown in FIG. 9 in Steps 8030 and 8070.

In this embodiment, the setting program 1351 calculates the generation count in Steps 8040 to 8060 from a backup data retention period and RPO entered by a user. A user may enter a generation count instead of a backup data retention period so that the setting program 1351 obtains a backup data retention period by calculating Expression 3 from the entered generation count and RPO.

Backup data retention period=(generation count−1)× RPO (Expression 3)

The backup condition registration console 9000 displayed in Step 8025 shown in FIG. 8 will be described next with reference to FIG. 9.

FIG. 9 is an explanatory diagram of the backup condition registration console 9000 according to the first embodiment of this invention.

The backup condition registration console 9000 has a backup data retention period input field 9003, an RPO input field 9004, policy for fall back operation input check boxes (radio buttons) 9005, a volume count display field 9006, an "execute" button 9001, and the "cancel" button 9002.

The backup data retention period input field 9003 is a field in which the user enters a backup data retention period. The RPO input field 9004 is a field in which the user enters an RPO. The policy for fall back operation check boxes 9005 enable the user to choose a policy for fall back operation.

The volume count display field 9006 is a field displayed in Step 8060 of the backup environment setting processing shown in FIG. 8 in order to display the count of the logical volumes 1021 that are used for backup operation.

The volume count display field 9006 is updated by the setting program 1351 when a value entered in the backup data retention period input field 9003 or the RPO input field 9004 is changed.

The "execute" button 9001 is a button that is pressed by the user when the user authorizes backup conditions such as a used volume count displayed in the volume count display field 9006 in Step 8070 of the backup environment setting processing shown in FIG. 8. The "cancel" button 9002 is a button that is pressed by the user when the backup environment setting processing is interrupted in Steps 8030 and 8070.

Backup processing by the backup instruction program 1352 will be described next with reference to FIG. 10.

Figure 10:
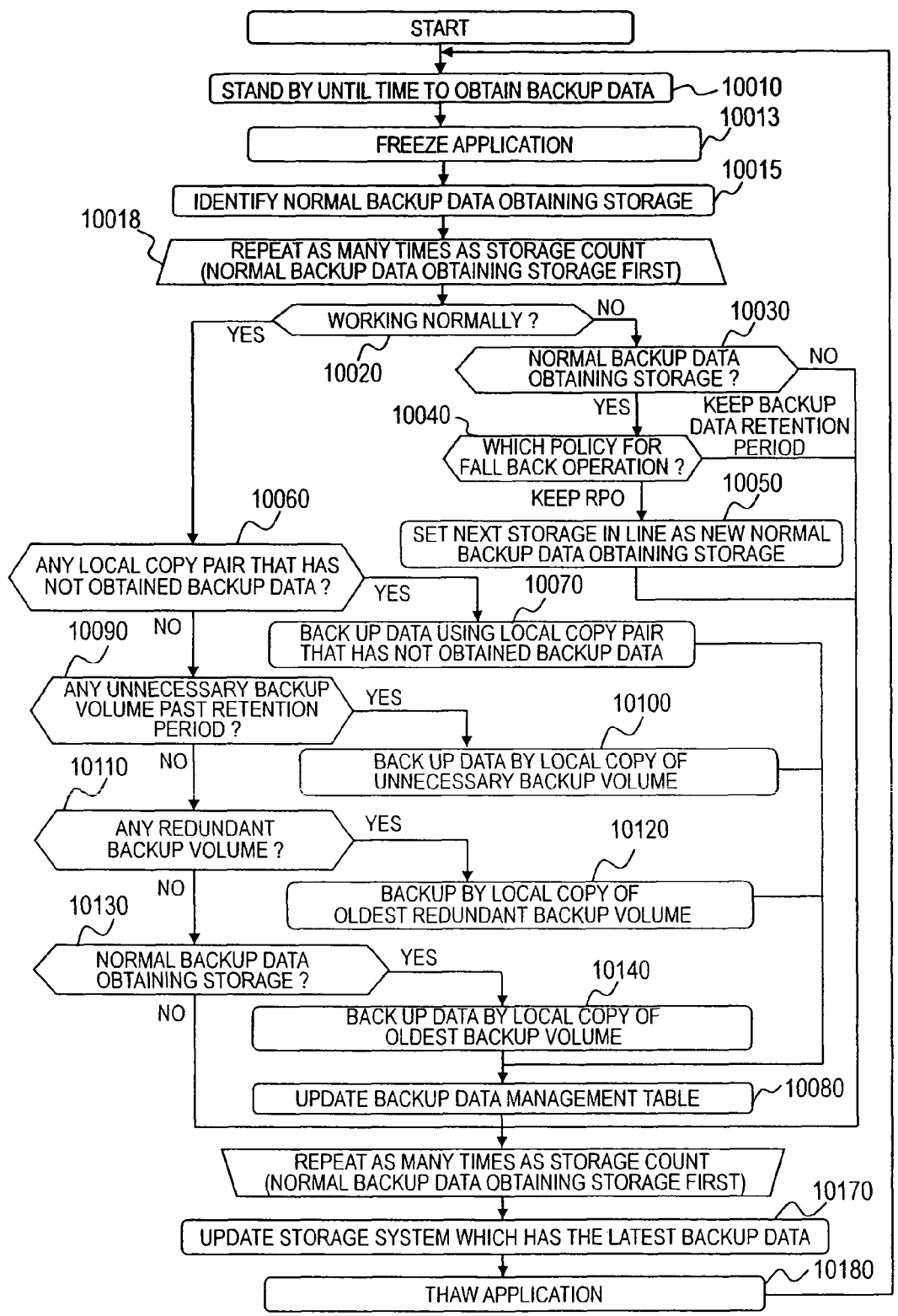
FIG. 10 is a flow chart of a backup processing executed by a backup instruction program according to the first embodiment of this invention.

FIG. 10 is a flow chart of the backup processing executed by the backup instruction program 1352 according to the first embodiment of this invention.

The user specifies for which application 1261 data is to be backed up, thereby causing the backup instruction program 1352 to start the backup processing.

The backup instruction program 1352 refers to the backup policy management table 6000 shown in FIG. 6, and stands by until the current date/time arrives at the RPO of the application 1261 specified by the user (10010).

When the current date/time arrives at the RPO of the specified application 1261, the backup instruction program 1352 sends a command for freezing the application 1261 specified by the user to the recovery manager 1262 of the host computer 1200 that executes this application 1261 (10013). Freezing the application 1261 means stopping data write in a data volume by the application 1261.

The backup instruction program 1352 next refers to the backup policy management table 6000 shown in FIG. 6 to identify a normal backup data obtaining storage system to which data is backed up (10015).

Specifically, the backup instruction program 1352 chooses from the backup policy management table 6000 shown in FIG. 6 an entry whose application ID 6001 matches the identifier of the application 1261 specified by the user.

The backup instruction program 1352 extracts a storage system identifier registered as the latest backup data holding storage ID 6006 from the chosen entry. The obtained storage system identifier is the identifier of the storage system that has been identified as the normal backup data obtaining storage system when the last time data is backed up.

Each time a backup of data is taken, the backup instruction program 1352 changes the normal backup data obtaining storage system from one storage system to another in an order in which storage systems are registered as the backup data obtaining storage 6005 in the backup policy management table 6000. The backup instruction program 1352 therefore obtains, from among storage system identifiers registered as the backup data obtaining storage 6005 in the chosen entry, as the identifier of the normal backup data obtaining storage system, a storage system identifier that follows the latest backup data holding storage ID 6006 extracted.

In the case where a storage system identifier registered as the latest backup holding storage ID 6006 is the last identifier on a list of storage system identifiers registered as the backup data obtaining storage 6005, or in the case where there is no value registered as the latest backup data holding storage ID 6006, the backup instruction program 1352 obtains, as the identifier of the normal backup data obtaining storage system, a storage system identifier at the top of the list of storage system identifiers registered as the backup data obtaining storage 6005.

The backup instruction program 1352 next repeats Steps 10020 to 10140 as many times as the count of the backup data obtaining storage systems (10018). Steps 10020 to 10140 are executed for the normal backup data obtaining storage system before other backup data obtaining storage systems.

First, the backup instruction program 1352 communicates with the control program 1018 of a storage system to be processed, and judges whether or not this storage system is working normally (Step 10020).

When it is judged in Step 10020 that the storage system to be processed is not working normally, the backup instruction program 1352 judges whether or not the storage system to be processed is the normal backup data obtaining storage system (Step 10030).

When it is judged in Step 10030 that the storage system to be processed is not the normal backup data obtaining storage system, the backup instruction program 1352 stops processing this storage system, chooses the next storage system as a storage system to be processed, and returns to Step 10018.

When it is judged in Step 10030 that the storage system to be processed is the normal backup data obtaining storage system, on the other hand, the backup instruction program 1352 searches the backup policy management table 6000 shown in FIG. 6 for an entry whose application ID 6001 matches the identifier of the application 1261 specified by the user, and extracts a value registered as the policy for fall back operation 6004 from the found entry (Step 10040).

In the case where the policy for fall back operation 6004 obtained in Step 10040 is "keep backup data retention period", the backup instruction program 1352 stops processing the storage system that is being processed, chooses the next storage system as a storage system to be processed, and returns to Step 10018.

In the case where the policy for fall back operation 6004 obtained in Step 10040 is "keep RPO", the backup instruction program 1352 identifies, as a new normal backup data obtaining storage system, a storage system whose identifier follows the identifier of the currently identified normal backup data obtaining storage system (10050), and returns to Step 10018. Specifically, the backup instruction program 1352 obtains, from a list of storage system identifiers registered as the backup data obtaining storage 6005, as the identifier of the new normal backup data obtaining storage system, a storage system identifier that follows the identifier of the currently identified normal backup data obtaining storage system.

Returning to Step 10018, the backup instruction program 1352 processes the normal backup data obtaining storage system newly identified in Step 10050.

When no storage system is identified as the normal backup data obtaining storage system in Step 10050, the backup instruction program 1352 outputs the error to a log and aborts the backup processing.

When it is judged in Step 10020 that the storage system to be processed is working normally, the backup instruction program 1352 refers to the backup data management table 7000 shown in FIG. 7 to judge whether or not any of the backup volumes located in this storage system to be processed has not obtained backup data (10060).

Specifically, the backup instruction program 1352 selects from the backup data management table 7000 shown in FIG. 7 every entry whose application ID 7001 matches the identifier of the application 1261 specified by the user. From among the selected entries, the backup instruction program 1352 selects any entry whose backup source storage ID 7003 or backup destination storage ID 7005 matches the identifier of the storage system that is being processed.

The backup instruction program 1352 then judges whether or not an entry that holds no value as the backup data obtained time 7007 is found among the selected entries.

When it is judged in Step 10060 that one of the backup volumes has not obtained backup data, the backup instruction program 1352 takes a backup by copying data from a backup source volume (data volume or mirrored volume) of this backup volume to this backup volume with the use of the local copy function (10070).

Specifically, the backup instruction program 1352 sends an instruction to back up data to the backup volume that has not obtained backup data to the control program 1018 of a storage system where this backup volume is located.

After data is backed up to the backup volume that has not obtained backup data in Step 10070, the backup instruction program 1352 chooses from the backup data management table 7000 shown in FIG. 7 an entry whose backup destination storage ID 7005 and backup destination volume ID 7006 match the identifier of the storage system that has the backup volume to which data is backed up in Step 10070 and the identifier of this backup volume, respectively.

In the chosen entry, the backup instruction program 1352 updates the backup data obtained time 7007 and the normal/redundant flag 7008 (10080).

Specifically, the backup instruction program 1352 registers as the backup data obtained time 7007 information indicating the date and time at which the application 1261 has been frozen in Step 10013. As the normal/redundant flag 7008, the backup instruction program 1352 registers "normal" in the case where data stored in the backup volume is backup data that is copied while the storage system is chosen as the normal backup data obtaining storage system, and "redundant" in the case where data stored in the backup volume is backup data that is copied while the storage system is not chosen as the normal backup data obtaining storage system.

When it is judged in Step 10060 that all of the backup volumes located in the storage system being processed have obtained backup data, the backup instruction program 1352 judges whether or not there is an unnecessary backup volume which has passed the backup data retention period since its backup data obtained time (10090).

Specifically, the backup instruction program 1352 selects from the backup data management table 7000 shown in FIG. 7 every entry whose backup destination storage ID 7005 matches the identifier of the storage system that is being processed. The backup instruction program 1352 judges whether or not the selected entries include an entry in which a period between the backup data obtained time 7007 and the current date/time is longer than the backup data retention period.

When it is judged in Step 10090 that there is at least one unnecessary backup volume which has passed the backup data retention period since its backup data obtained time, the backup instruction program 1352 arbitrarily chooses one of the unnecessary backup volumes which have passed the backup data retention period since their backup data obtained times, takes a backup by copying data from a backup source volume (data volume or mirrored volume) of the chosen backup volume to the chosen backup volume with the use of the local copy function (10100), and proceeds to Step 10080.

When it is judged in Step 10090 that there is no unnecessary backup volume which has passed the backup data retention period since its backup data obtained time, the backup instruction program 1352 judges whether or not the storage system that is being processed has a logical volume (redundant volume) to which data has been backed up while the storage system being processed is not identified as the normal backup data obtaining storage system (10110).

Specifically, the backup instruction program 1352 selects from the backup data management table shown in FIG. 7 every entry whose application ID 7001 matches the identifier of the application 1261 specified by the user. From among the selected entries, the backup instruction program 1352 selects any entry whose backup source storage ID 7003 or backup destination storage ID 7005 matches the identifier of the storage system that is being processed.

The backup instruction program 1352 judges whether or not the selected entries include an entry whose normal/redundant flag 7008 is "redundant".

When it is judged in Step 10110 that the storage system that is being processed contains at least one redundant volume, the backup instruction program 1352 takes a backup by copying data from a backup source volume (data volume or mirrored volume) of a redundant volume whose backup data obtained time 7007 is the oldest to this backup volume with the use of the local copy function (10120), and proceeds to Step 10080.

When it is judged in Step 10110 that the storage system that is being processed contains no redundant volume, on the other hand, the backup instruction program 1352 judges whether or not the storage system that is being processed is the normal backup data obtaining storage system (10130).

When it is judged in Step 10130 that the storage system being processed is the normal backup data obtaining storage system, the backup instruction program 1352 takes a backup by copying data from a backup source volume (data volume or mirrored volume) of a backup volume whose backup data obtained time 7007 is the oldest to this backup volume with the use of the local copy function (10140), and proceeds to Step 10080.

When it is judged in Step 10130 that the storage system being processed is not the normal backup data obtaining storage system, on the other hand, the backup instruction program 1352 ends the backup processing for the storage system that is being processed, chooses the next storage system as a storage system to be processed, and returns to Step 10018.

Next, the backup instruction program 1352 repeats Steps 10020 to 10140 as many times as the count of storage systems that are registered as the backup data obtaining storage 6005 in an entry of the backup policy management table 6000 shown in FIG. 6 whose application ID 6001 matches the identifier of the application 1261 specified by the user.

In the entry of the backup policy management table 6000 shown in FIG. 6 whose application ID 6001 matches the identifier of the application 1261 specified by the user, the backup instruction program 1352 registers as the latest backup data holding storage ID 6006 the identifier of the normal backup data obtaining storage system identified in Step 10015 (10170).

A command to freeze the application 1261 specified by the user is sent to the recovery manager 1262 of the host computer 1200 that executes this application 1261.

The backup instruction program 1352 next sends a command to thaw the application 1261 specified by the user to the recovery manager 1262 of the host computer 1200 that executes this application 1261 (10170), and returns to Step 10010.

A specific description will be given next with reference to FIGS. 11A to 11C and FIGS. 12A to 12E on how the backup instruction program 1352 executes the backup processing.

Illustrated in FIGS. 11A to 11C and FIGS. 12A to 12E are a case in which the RPO and the backup data retention period are set to one day and six days, respectively, and there are two backup data obtaining storage systems (RAID1 and RAID2). Backup volumes for four generations are set in each of the storage systems. The application 1261 for which data is backed up is "AP1".

Figure 11A:
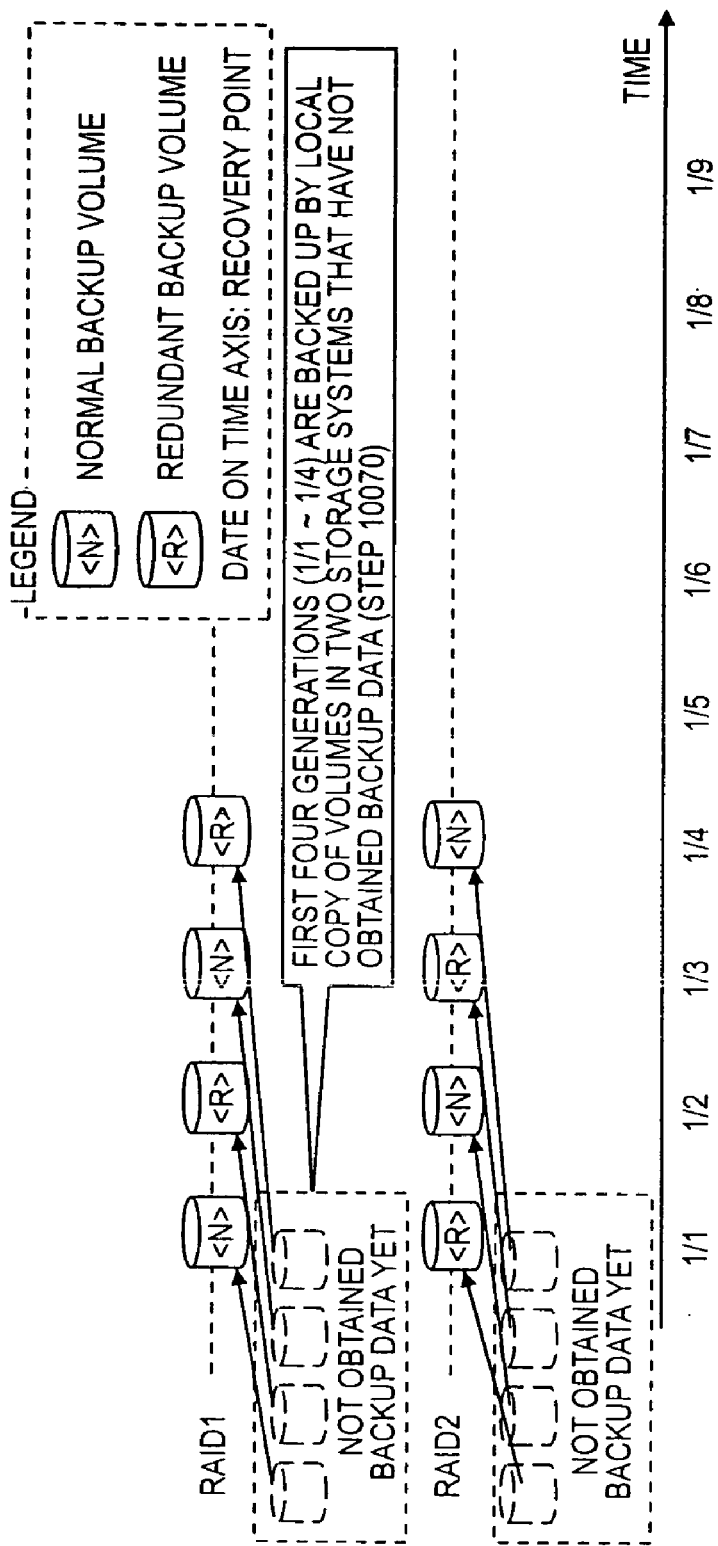
FIG. 11A is an explanatory diagram of a backup state immediately after a backup instruction program starts backup processing according to the first embodiment of this invention.
Figure 11B:
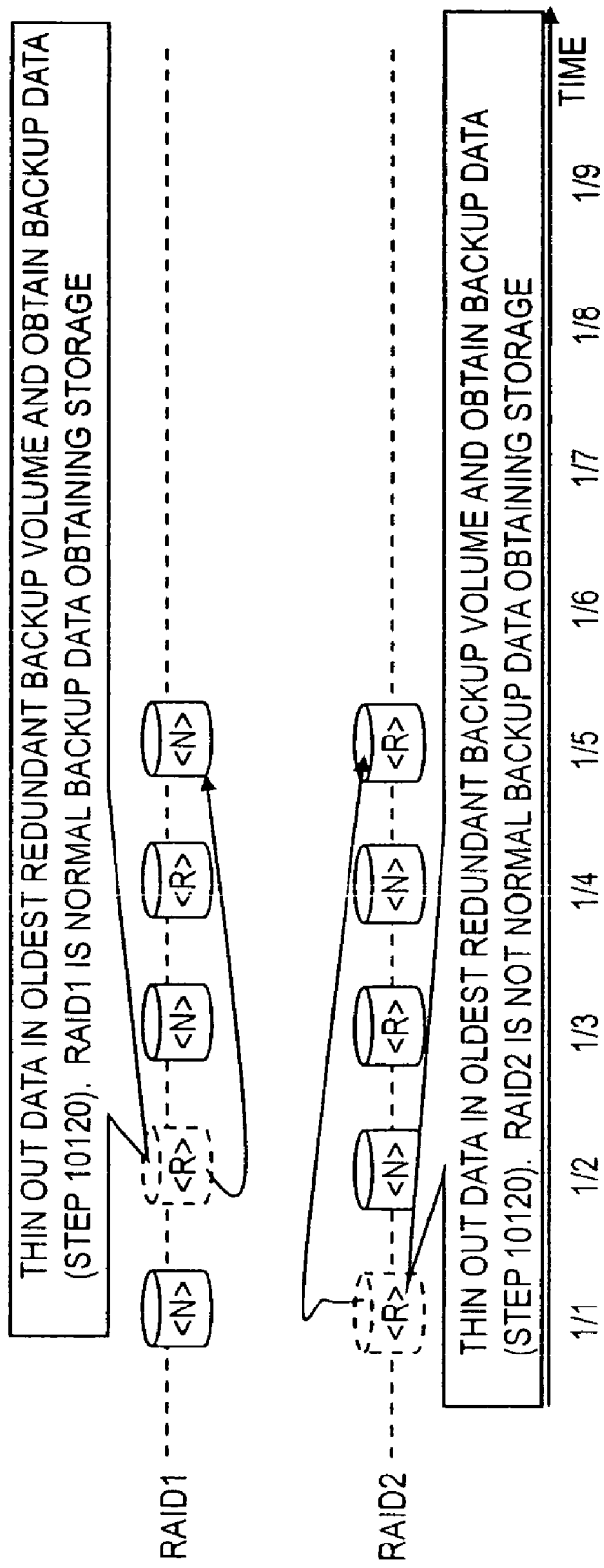
FIG. 11B is an explanatory diagram of a backup state when backup processing is executed after no unused backup volume is left in the storage systems according to the first embodiment of this invention.
Figure 11C:
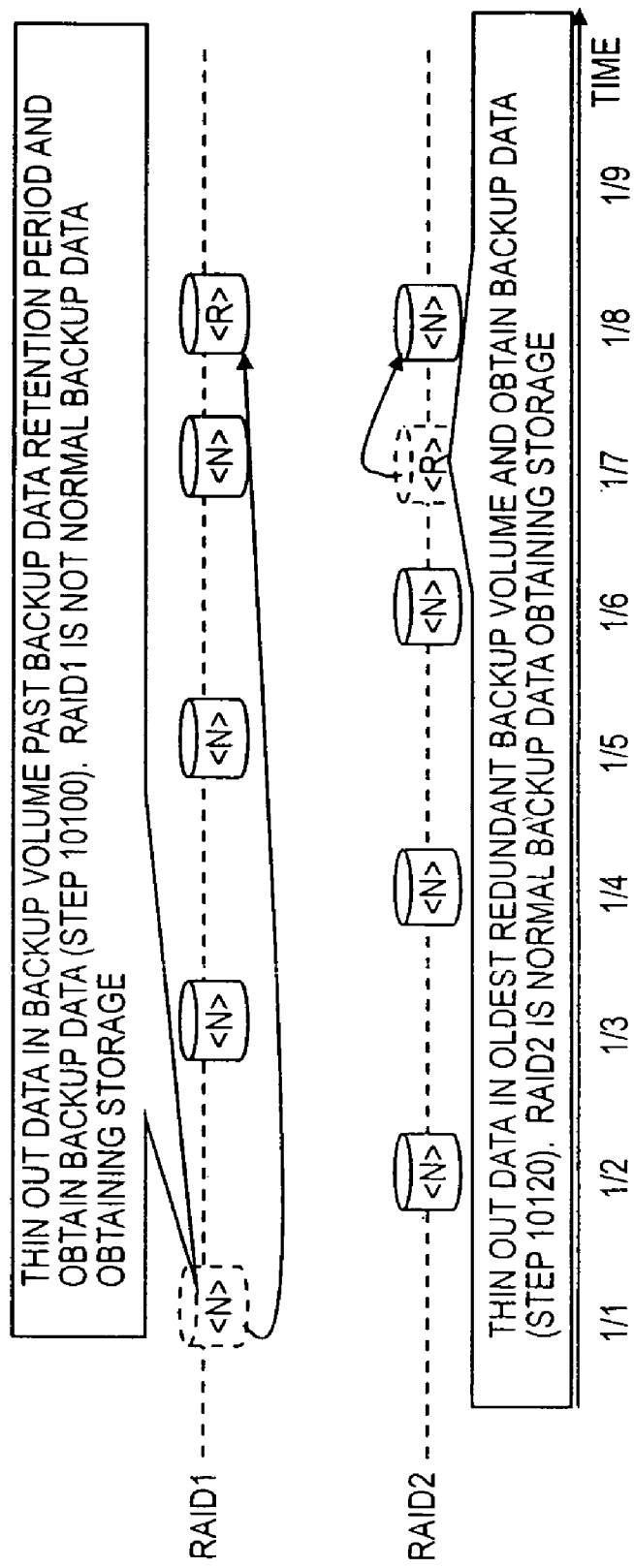
FIG. 11C is an explanatory diagram of a backup state when a backup volume has passed the backup data retention period according to the first embodiment of this invention.

FIGS. 11A to 11C are explanatory diagrams showing a backup state in a period immediately after the backup instruction program 1352 starts backup processing until trouble occurs in one of the storage systems. FIGS. 12A to 12E are explanatory diagrams of a backup state when the backup instruction program 1352 performs fall back operation due to a failure in one of the storage systems.

FIG. 11A is an explanatory diagram of a backup state immediately after the backup instruction program 1352 starts backup processing according to the first embodiment of this invention.

The backup processing is started on January 1. The backup instruction program 1352 stalls the backup processing until a given time set as RPO arrives. After the given time set as RPO passes, the backup instruction program 1352 proceeds to Step 10010 and freezes the relevant application 1261.

The backup instruction program 1352 then moves to Step 10015. At this point, no value has been registered as the latest backup data holding storage ID 6006 in the backup policy management table 6000 shown in FIG. 6 because the backup processing has just begun. The backup instruction program 1352 therefore obtains RAID1, which is at the top of a list of storage systems registered as the backup data obtaining storage 6005 (RAID1 and RAID2), as the identifier of the normal backup data obtaining storage system. A storage system that is identified as the normal backup data obtaining storage system is processed before other backup data obtaining storage systems, and RAID1 identified as the normal backup data obtaining storage system is accordingly processed first.

After RAID1 is confirmed as working normally, the backup instruction program 1352 proceeds to Step 10060.

RAID1 has unused backup volumes which have not obtained backup data, and the backup instruction program 1352 accordingly proceeds to Step 10070. In Step 10070, the backup instruction program 1352 backs up data stored in a data volume in RAID1 that is used by AP1 to one of the unused backup volumes, and then proceeds to Step 10080.

In Step 10080, the backup instruction program 1352 registers the time at which the application 1261 has been frozen as the backup data obtained time 7007 in an entry of the backup data management table 7000 shown in FIG. 7 for the backup volume to which the data has just been backed up. The backup instruction program 1352 also registers "normal" as the normal/redundant flag 7008 in this entry since the backup volume to which the data has just been backed up is located in RAID1 which is the normal backup data obtaining storage system.

The backup instruction program 1352 returns to Step 10018 to perform backup processing on RAID2.

In Step 10018 for RAID2, the backup instruction program 1352 chooses RAID2 as a storage system to be processed.

RAID2 has unused backup volumes. The backup instruction program 1352 backs up data stored in a mirrored volume in RAID2 that is associated with the data volume in RAID1 that is used by AP1 to one of the unused backup volumes, and then proceeds to Step 10080.

In Step 10080, because RAID2 is not the normal backup data obtaining storage, the backup instruction program 1352 registers "redundant" as the normal/redundant flag 7008 in an entry of the backup data management table 7000 shown in FIG. 7 for the backup volume to which the data has just been backed up.

Now that the backup processing has been executed for every backup data obtaining storage system, the backup instruction program 1352 proceeds to Step 10170. In Step 10170, the backup instruction program 1352 registers RAID1, which is the normal backup data obtaining storage system, as the latest backup data holding storage ID 6006 in the entry of the backup policy management table 6000 shown in FIG. 6 whose application ID 6001 is AP1. The backup instruction program 1352 then returns to Step 10010.

When the next backup timing (January 2) arrives upon passage of the given time set as RPO, the backup instruction program 1352 chooses RAID2 as the normal backup data obtaining storage in Step 10015 and executes backup processing.

The backup processing is repeatedly executed in this manner and, by January 4, all backup volumes in RAID1 and RAID2 have stored backup data with no unused backup volume left within RAID1 and RAID2.

FIG. 11B is an explanatory diagram of a backup state when backup processing is executed after no unused backup volume is left in the storage systems according to the first embodiment of this invention.

Executing backup processing on January 5, the backup instruction program 1352 chooses RAID1 as the normal backup data obtaining storage in Step 10015 since RAID2 has been chosen as the normal backup data obtaining storage on January 4.

The backup instruction program 1352 judges in Step 10060 that no unused backup volume is found in RAID1, and judges in Step 10090 that RAID1 does not have any unnecessary backup volume which has passed the backup data retention period.

The backup instruction program 1352 judges in Step 10110 that RAID1 has redundant volumes, and proceeds to Step 10120.

In Step 10120, the backup instruction program 1352 thins out data in one of the redundant volumes whose backup data obtained time is the oldest (backup volume that has obtained backup data on January 2), and backs up data stored in the data volume in RAID1 that is used by AP1 to this oldest redundant volume.

The backup instruction program 1352 next performs backup processing on RAID2. RAID2 does not have an unused backup volume nor an unnecessary backup volume which has passed the backup data retention period, but has redundant volumes. The backup instruction program 1352 accordingly thins out data in one of the redundant volumes whose backup data obtained time is the oldest (backup volume that has obtained backup data on January 1), and backs up data stored in a mirrored volume in RAID2 that is associated with the data volume in RAID1 that is used by AP1 to this oldest redundant volume in Step 10120.

FIG. 11C is an explanatory diagram of a backup state when a backup volume has passed the backup data retention period according to the first embodiment of this invention.

The backup processing shown in FIG. 11B is executed up through January 7. Executing backup processing on January 8, the backup instruction program 1352 chooses RAID2 as the normal backup data obtaining storage in Step 10015 because RAID1 has been chosen as the normal backup data obtaining storage on January 7.

RAID2 does not have an unused backup volume nor an unnecessary backup volume which has passed the backup data retention period, but has a redundant volume. Therefore, as has been described with reference to FIG. 11B, the backup instruction program 1352 thins out data in the redundant volume whose backup data obtained time is the oldest (backup volume that has obtained backup data on January 7), and backs up data stored in a mirrored volume in RAID2 that is associated with the data volume in RAID1 that is used by AP1 to this oldest redundant volume in Step 10120.

The backup instruction program 1352 next performs backup processing on RAID1.

RAID1 does not have an unused backup volume nor a redundant volume, but has a backup volume that has passed the backup data retention period (backup volume that has obtained backup data on January 1). The backup instruction program 1352 accordingly thins out data in the backup volume that has passed the backup data retention period, and backs up data stored in the data volume in RAID1 that is used by AP1 to this oldest redundant volume in Step 10100.

RAID1 and RAID2 thus take turns in obtaining backup data, so, if a disaster or the like causes one of the storage systems to stop working normally, an increase in RPO can be limited to twice the requested RPO. In addition, degradation of the backup data retention period when a disaster or the like causes one of the storage systems to stop working normally can be limited to a length calculated by "requested backup data retention period—RPO".

Figure 12A:
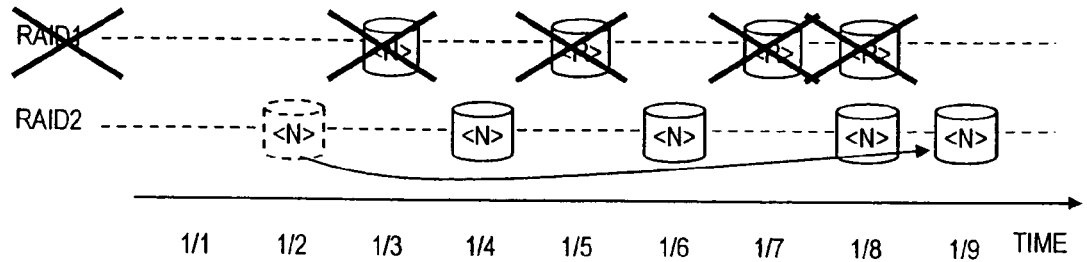
FIG. 12A is an explanatory diagram of a backup state when a failure occurs in RAID1 and fall back operation is performed under a policy "keep RPO" according to the first embodiment of this invention.

FIG. 12A is an explanatory diagram of a backup state when a failure occurs in RAID1 and fall back operation is performed under a policy "keep RPO" according to the first embodiment of this invention.

A failure has occurred in RAID1 after the backup processing shown in FIG. 11C has been executed on January 8.

Executing backup processing on January 9, the backup instruction program 1352 chooses RAID1 as the normal backup data obtaining storage in Step 10015 because RAID2 has been chosen as the normal backup data obtaining storage on January 8.

The backup instruction program 1352 judges in Step 10020 that RAID1 which is being processed is not working normally, and proceeds to Step 10030.

When it is judged that RAID1 which is being processed is not working normally, the backup instruction program 1352 sends a command to the mirror host computer 1200 to set a mirrored volume in RAID2 and make the relevant application 1261 write data in the mirrored volume.

RAID1 is the normal backup data obtaining storage and the policy for fall back operation is "keep RPO". The backup instruction program 1352 accordingly chooses RAID2 as new normal backup data obtaining storage in Step 10050.

The backup instruction program 1352 then returns to Step 10018 to perform backup processing on RAID2.

RAID2 is working normally and the backup instruction program 1352 proceeds to Steps 10060 to 10140.

RAID2 has none of an unused backup volume, a backup volume that has passed the backup data retention period, and a redundant volume. The backup instruction program 1352 accordingly proceeds to Step 10130. In Step 10140, because RAID2 is the normal backup data obtaining storage, the backup instruction program 1352 thins out data in a backup volume whose backup data obtained time is the oldest (backup volume that has obtained backup data on January 2), and backs up data stored in the mirrored volume in RAID2 that is associated with the data volume in RAID1 that is used by AP1 to this backup volume.

Figure 12B:
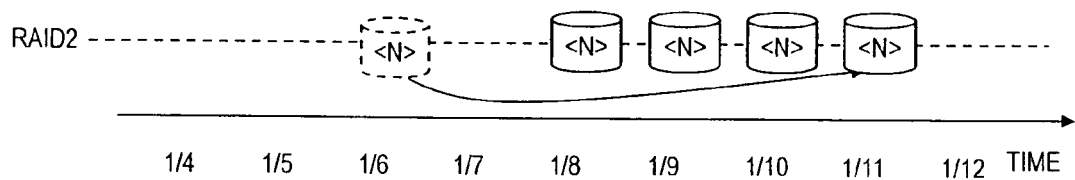
FIG. 12B is an explanatory diagram of a backup state after fall back operation has been executed for three days under a policy "keep RPO" according to the first embodiment of this invention.

FIG. 12B is an explanatory diagram of a backup state after fall back operation has been executed for three days under a policy "keep RPO" according to the first embodiment of this invention.

Backup processing on January 11 is the same as shown in FIG. 12A, and its description will not be repeated.

When RAID1 is not working normally and the policy for fall back operation employed is "keep RPO", the backup instruction program 1352 thus backs up data each time the RPO is reached by thinning out data in one of the backup volumes in RAID2 whose backup data obtained time is the oldest.

In a backup state after fall back operation is executed under a policy "keep RPO" as shown in FIG. 12B, only four days of data can be backed up but the backed up data is day-by-day data. In other words, the backup instruction program 1352 keeps the RPO by sacrificing the backup data retention period.

Figure 12C:
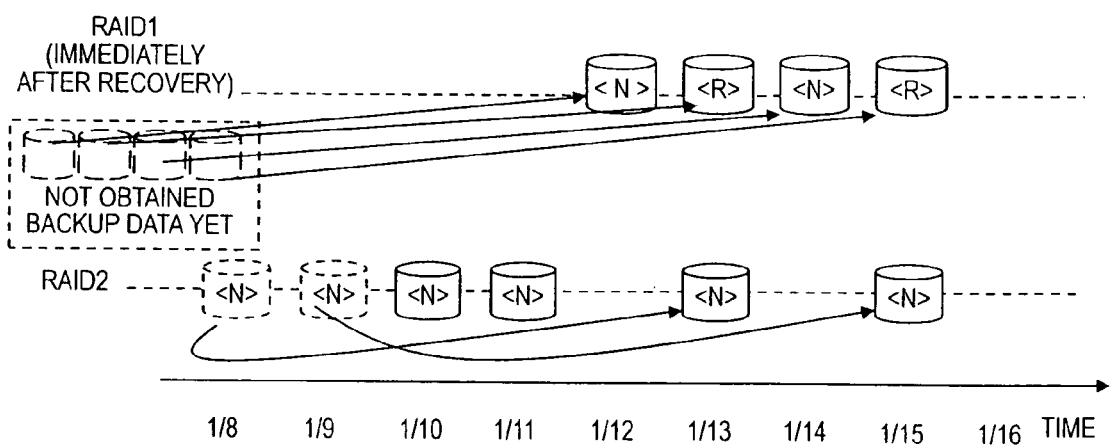
FIG. 12C is an explanatory diagram of a backup state when RAID1 recovers from a failure after the backup state shown in FIG. 12B and backup operation is performed with both RAID1 and RAID2 again according to the first embodiment of this invention.

FIG. 12C shows a backup state when RAID1 recovers from a failure after the backup state shown in FIG. 12B and backup operation is performed with both RAID1 and RAID2 again according to the first embodiment of this invention.

In backup processing on January 12, where RAID1 has already recovered from a failure, RAID1 is chosen as the normal backup data obtaining storage since RAID2 has been chosen as the normal backup data obtaining storage in the backup processing on January 11.

RAID1 has an unused backup volume, and the backup instruction program 1352 backs up the data volume used by AP1 to this unused backup volume.

RAID2, on the other hand, has none of an unused backup volume, a backup volume that has passed the backup data retention period, and a redundant volume. The backup instruction program 1352 accordingly proceeds to Step 10130. In Step 10130, because RAID2 is not the normal backup data obtaining storage system, the backup instruction program 1352 does not take a backup of data and ends the backup processing for RAID2.

In backup processing executed on January 13, RAID2 is chosen as the normal backup data obtaining storage system since RAID1 has been chosen as the normal backup data obtaining storage system in the backup processing on January 12.

RAID2 has none of an unused backup volume, a backup volume that has passed the backup data retention period, and a redundant volume. The backup instruction program 1352 accordingly proceeds to Step 10130. In Step 10130, RAID2 is judged as the normal backup data obtaining storage system, and the backup instruction program 1352 proceeds to Step 10140. In Step 10140, the backup instruction program 1352 thins out data in one of the backup volumes in RAID2 whose backup data obtained time is the oldest, and backs up data stored in the mirrored volume in RAID2 that is associated with the data volume in RAID1 that is used by AP1 to this backup volume.

RAID1, on the other hand, has an unused backup volume, and the backup instruction program 1352 backs up data stored in the data volume in RAID1 that is used by AP1 to this unused backup volume in Step 10070.

Backup processing on January 14 is the same as the one on January 12, and backup processing on January 15 is the same as the one on January 13. Therefore, descriptions of the backup processing on January 14 and 15 will be omitted.

Figure 12D:
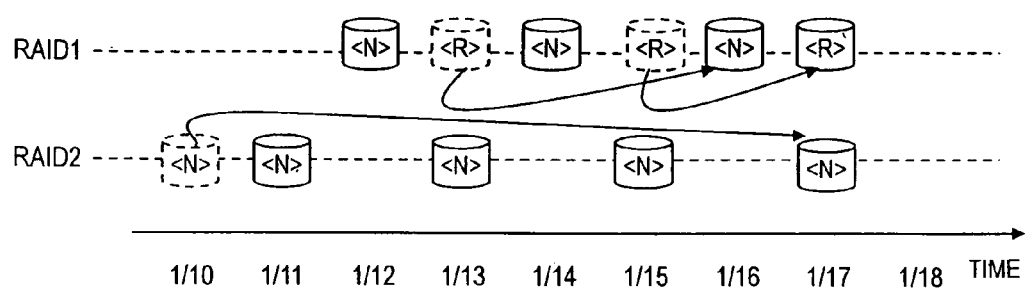
FIG. 12D is an explanatory diagram of a backup state when the backup processing shown in FIG. 12C is executed further according to the first embodiment of this invention.

FIG. 12D is an explanatory diagram of a backup state when the backup processing shown in FIG. 12C is executed further according to the first embodiment of this invention.

In backup processing executed on January 16, RAID1 is chosen as the normal backup data obtaining storage system. RAID1 has redundant volumes. The backup instruction program 1352 thins out data in one of the redundant volumes whose backup data obtained time is the oldest (backup volume that has obtained backup data on January 13), and backs up data stored in the data volume in RAID1 that is used by AP1 to this backup volume.

RAID2, on the other hand, has none of an unused backup volume, a backup volume that has passed the backup data retention period, and a redundant volume. The backup instruction program 1352 accordingly proceeds to Step 10130. In Step 10130, because RAID2 is not the normal backup data obtaining storage system, the backup instruction program 1352 does not take a backup of data and ends the backup processing for RAID2.

In backup processing executed on January 17, RAID2 is chosen as the normal backup data obtaining storage system. In Step 10140, the backup instruction program 1352 thins out data in one of the backup volumes in RAID2 whose backup data obtained time is the oldest, and backs up data stored in the mirrored volume in RAID2 that is associated with the data volume in RAID1 that is used by AP1 to this backup volume.

RAID1, on the other hand, has redundant volumes. The backup instruction program 1352 accordingly thins out data in one of the redundant volumes whose backup data obtained time is the oldest (backup volume that has obtained backup data on January 15), and backs up data stored in the data volume in RAID1 that is used by AP1 to this backup volume.

The backup state thus returns to what it is in normal operation.

Figure 12E:
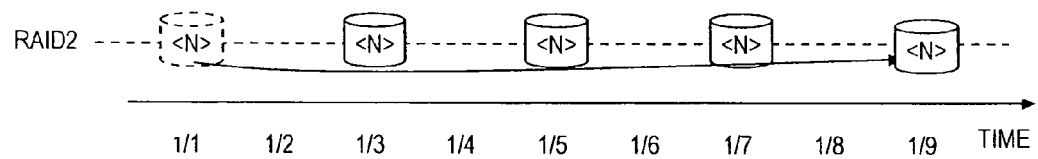
FIG. 12E is an explanatory diagram of a backup state when a failure occurs in RAID1 and fall back operation is performed under a policy "keep backup data retention period" according to the first embodiment of this invention.

FIG. 12E is an explanatory diagram of a backup state when a failure occurs in RAID1 and fall back operation is performed under a policy "keep backup data retention period" according to the first embodiment of this invention.

In backup processing executed on January 8, RAID1 is chosen as the normal backup data obtaining storage. The backup instruction program 1352 judges in Step 10020 that RAID1 which is being processed is not working normally, and proceeds to Step 10030.

RAID1 is the normal backup data obtaining storage and the policy for fall back operation is "keep backup data retention period". The backup instruction program 1352 accordingly returns to Step 10018.

RAID2 is working normally and the backup instruction program 1352 proceeds to Steps 10060 to 10140.

RAID2 has none of an unused backup volume, a backup volume that has passed the backup data retention period, and a redundant volume. The backup instruction program 1352 accordingly proceeds to Step 10130. Since RAID2 is not the normal backup data obtaining storage, the backup instruction program 1352 does not take a backup of data and ends the backup processing for RAID2.

In short, the backup instruction program 1352 does not back up data of January 8.

In backup processing executed on January 9, RAID2 is chosen as the normal backup data obtaining storage. The backup instruction program 1352 thins out data in a backup volume in RAID2 that has passed the backup data retention period (backup volume that has obtained backup data on January 1), and backs up data stored in the mirrored volume in RAID2 that is associated with the data volume in RAID1 that is used by AP1 to this backup volume in Step 10100.

The backup instruction program 1352, on the other hand, judges in Step 10030 that RAID1 is not the normal backup data obtaining storage, and ends the backup processing.

When the policy for fall back operation employed is "keep backup data retention period", data is thus backed up every other day to RAID2 which is working normally. The backup instruction program 1352 keeps the backup data retention period by sacrificing the RPO in this manner.

Figure 13:
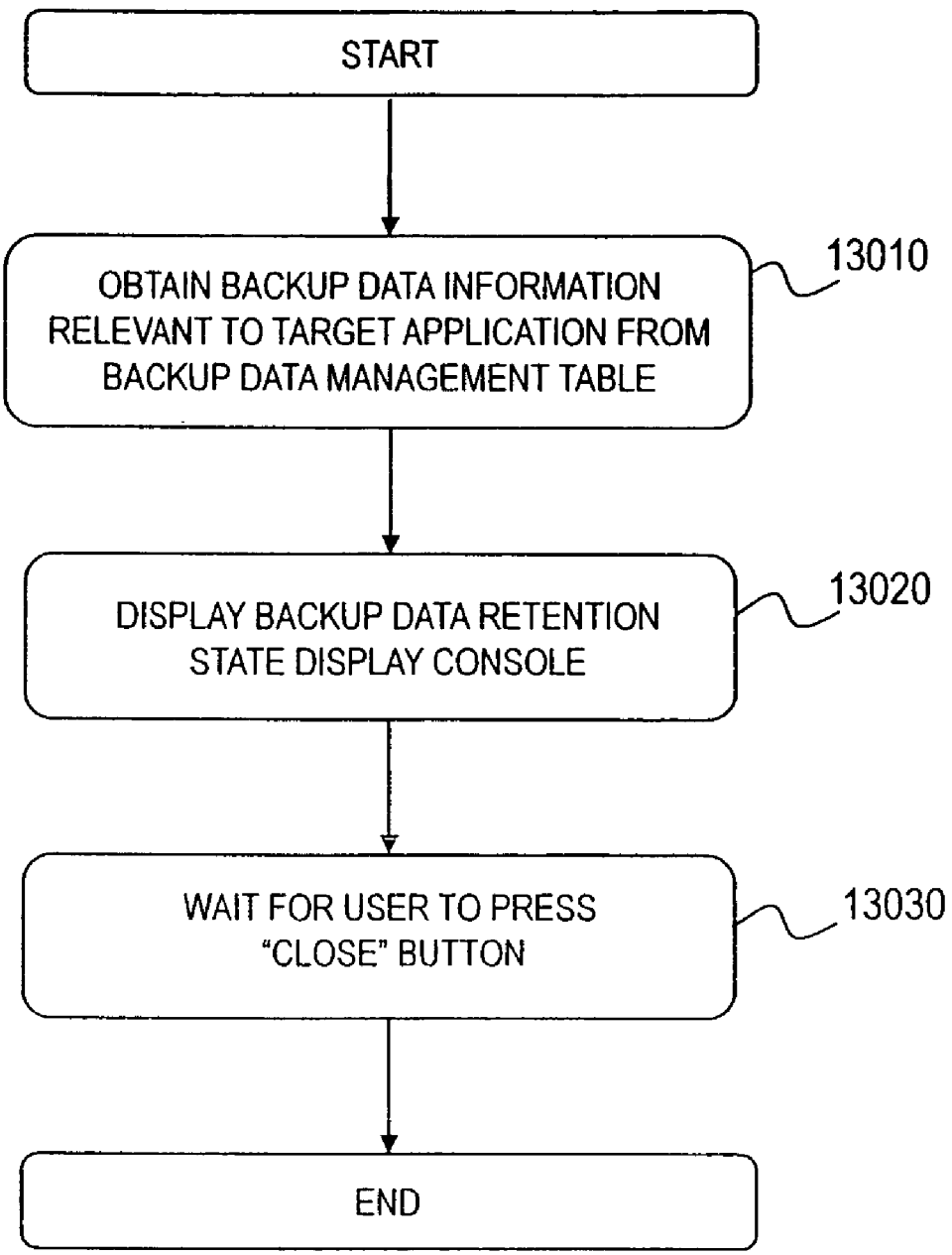
FIG. 13 is a flow chart of a backup data retention state display processing executed by a operation state display program according to the first embodiment of this invention.

Described next with reference to FIG. 13 is backup data retention state display processing by the operation state display program 1353. FIG. 13 is a flow chart of the backup data retention state display processing executed by the operation state display program 1353 according to the first embodiment of this invention.

Figure 14:
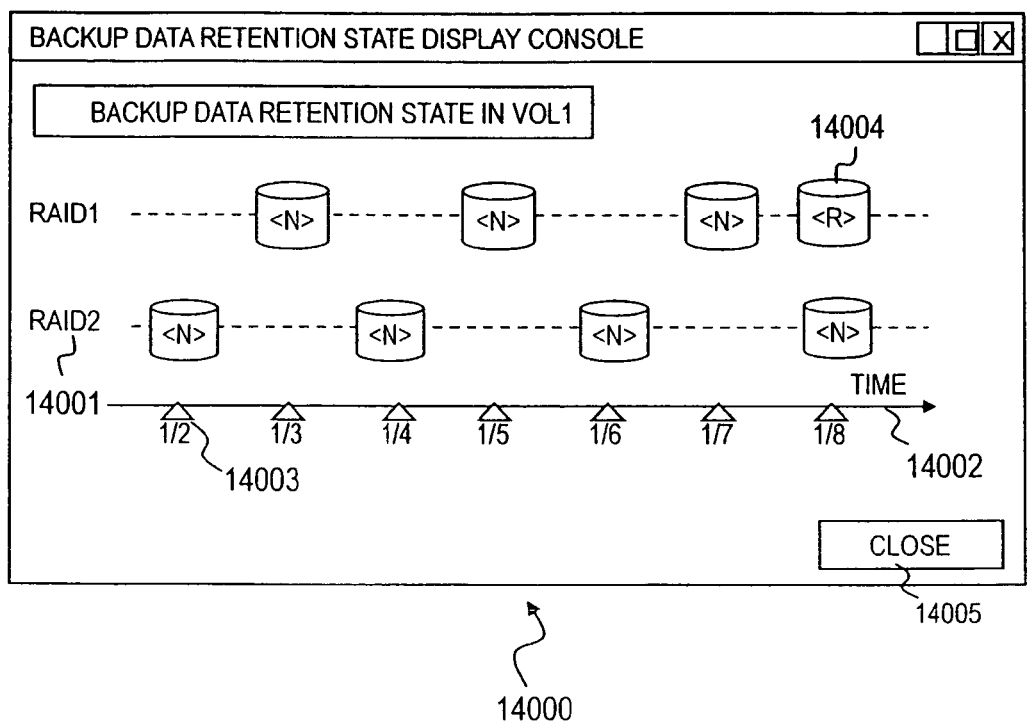
FIG. 14 is an explanatory diagram of a backup data retention state display console according to the first embodiment of this invention.

The backup data retention state display processing is processing of displaying a backup data retention state display console 14000, which is illustrated in FIG. 14 and enables the user to check which storage system stores backup data at which recovery point.

The user specifies for which application 1261 the backup data retention state is to be displayed, thereby causing the operation state display program 1353 to start the backup data retention state display processing.

The operation state display program 1353 first refers to the backup data management table 7000 shown in FIG. 7 to obtain information on the obtained time, backup destination storage system, and backup volume of backup data held by a local copy pair that is associated with the specified application 1261 (13010).

Specifically, the operation state display program 1353 selects from the backup data management table 7000 every entry whose application ID 7001 matches the identifier of the application 1261 specified by the user.

From each of the selected entries, the operation state display program 1353 extracts a storage system identifier registered as the backup destination storage ID 7005, an identifier of the logical volume 1021, which is registered as the backup destination volume ID 7006, date/time information registered as the backup data obtained time 7007, and information registered as the normal/redundant flag 7008.

The operation state display program 1353 then displays the backup data retention state display console 14000 on the display 1320 based on the information obtained in Step 13010 (13020). Details of the backup data retention state display console 14000 will be described with reference to FIG. 14.

The operation state display program 1353 next stalls the processing until a "close" button 14005 on the backup data retention state display console 14000 shown in FIG. 14 is pressed (13030). When the "close" button 14005 is pressed, the operation state display program 1353 removes the backup data retention state display console 14000 from the screen of the display 1320, and ends the backup data retention state display processing.

FIG. 14 is an explanatory diagram of the backup data retention state display console 14000 according to the first embodiment of this invention.

The backup data retention state display console 14000 has a backup data obtaining storage system list 14001, a time axis 14002, at least one recovery point 14003, and the "close" button 14005.

The backup data retention state display console 14000 is a graph of which horizontal axis is the time axis 14002 and vertical axis shows the backup data obtaining storage system list 14001.

Backup data retention icons 14004 are displayed at the coordinates of the recovery point 14003 which is displayed on the time axis 14002, and the coordinates of storage systems on the backup data obtaining storage system list 14001 which have obtained backup data at the recovery point 14003.

The backup data retention icons 14004 include "N: normal" and "R: redundant" icons. The "N" icon indicates that it is backup data obtained while the storage system in question is chosen as the normal backup data obtaining storage. The "R" icon indicates that it is backup data obtained while the storage system in question is not chosen as the normal backup data obtaining storage.

When the user presses the "close" button 14005, the operation state display program 1353 removes the backup data retention state display console 14000 from the screen and ends the backup data retention state display processing. The user may press the "close" button 14005 at any time.

Figure 15:
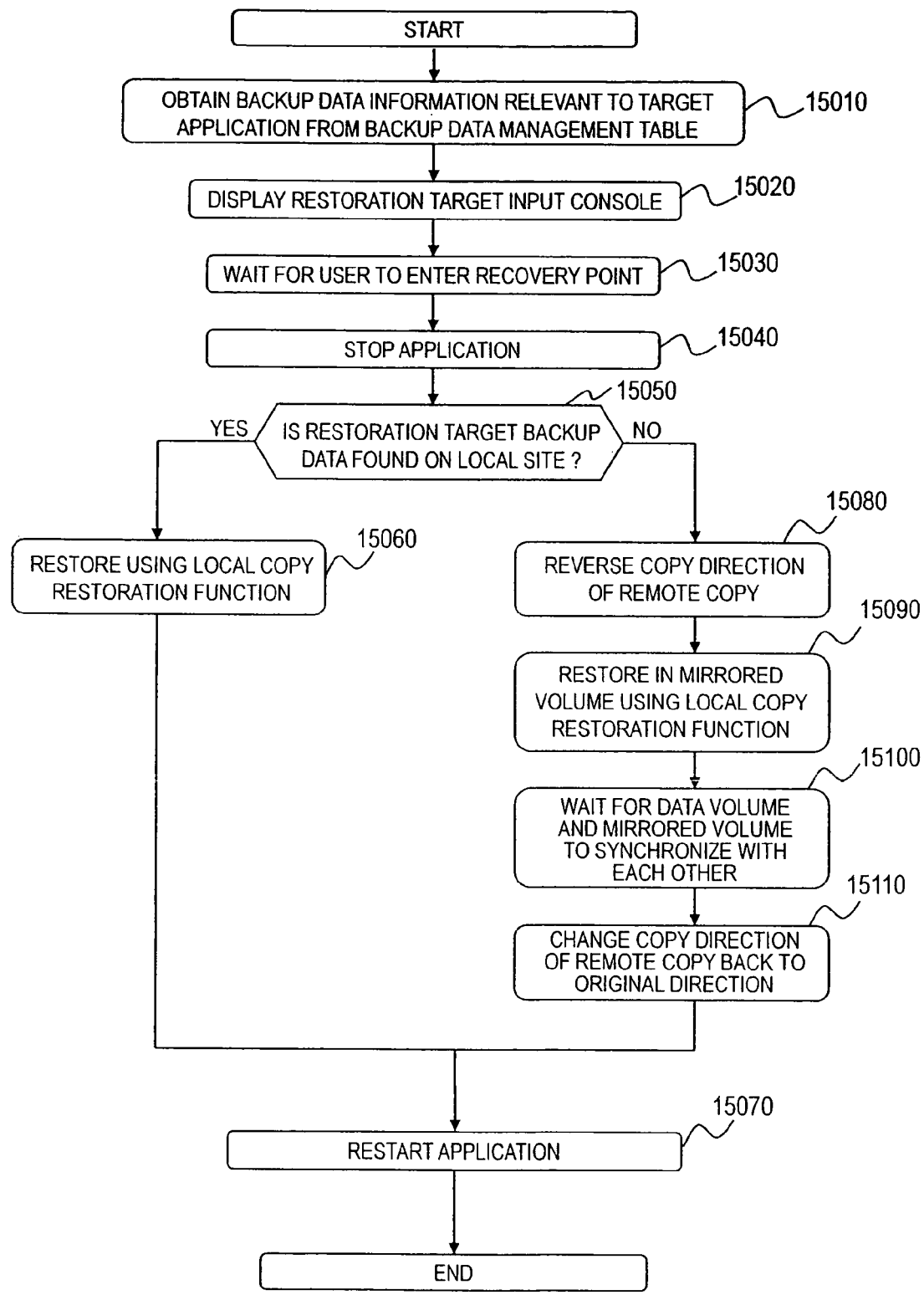
FIG. 15 is a flow chart of the restoration processing executed by a restoration instruction program according to the first embodiment of this invention.

Described next with reference to FIG. 15 is restoration processing for restoring destroyed data in a data volume by copying data stored in a backup volume to this data volume. FIG. 15 is a flow chart of the restoration processing executed by the restoration instruction program 1354 according to the first embodiment of this invention.

The restoration instruction program 1354 starts the restoration processing when the user specifies which application 1261 is relevant to destroyed data to be restored.

First, the restoration instruction program 1354 refers to the backup data management table 7000 shown in FIG. 7 to obtain information on the obtained time, backup destination storage system, and backup volume of backup data held by a local copy pair that is associated with the specified application 1261 (15010).

Step 15010 is the same as Step 13010 of the backup data retention state display processing shown in FIG. 13, and the description will not be repeated.

Figure 16:
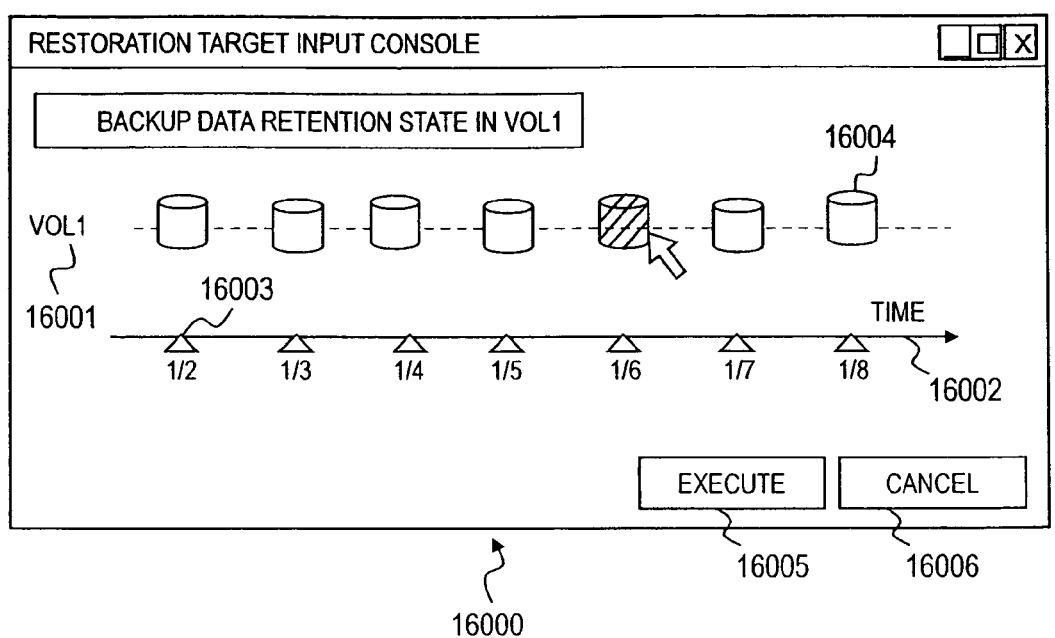
FIG. 16 is an explanatory diagram of a restoration target input console according to the first embodiment of this invention.

Next, the restoration instruction program 1354 displays a restoration target input console 16000 which is shown in FIG. 16 on the display 1320 based on the information obtained in Step 15010 (15020). Details of the restoration target input console 16000 will be described with reference to FIG. 16.

The restoration instruction program 1354 then stalls the processing until a recovery point which indicates the date and time when data used to repair destroyed data in a data volume has been copied is entered by the user through the restoration target input console 16000 (15030).

Upon input of a recovery point indicating the date and time when data used to repair destroyed data in a data volume has been copied, the restoration instruction program 1354 sends a command to stop the application 1261 specified by the user to the recovery manager 1262 (15040).

The restoration instruction program 1354 next judges whether or not a storage system that holds data volume used by the application 1261 specified by the user is a storage system that stores backup data at the specified recovery point (15050). In other words, the restoration instruction program 1354 judges whether or not data for repairing destroyed data in a data volume that is used by the application 1261 specified by the user is found on a local site where a storage system containing the data volume is located.

Specifically, the restoration instruction program 1354 selects from the backup data management table 7000 shown in FIG. 7 any entry whose application ID 7001 matches the identifier of the application 1261 specified by the user.

From among the selected entries, the restoration instruction program 1354 chooses an entry whose backup data obtained time 7007 matches the date and time of the recovery point entered as the restoration target. The restoration instruction program 1354 extracts from the chosen entry a storage system identifier registered as the backup destination storage ID 7005. The extracted storage system identifier is the identifier of the storage system that stores backup data at the recovery point where data for repairing destroyed data in the data volume has been copied. The restoration instruction program 1354 also extracts from the chosen entry an identifier of the logical volume 1021, which is registered as the backup destination volume ID 7006. A backup volume that stores a backup of destroyed data in the data volume is thus identified.

The restoration instruction program 1354 chooses from the application management table 2000 shown in FIG. 2 an entry whose application ID 2001 matches the identifier of the application 1261 specified by the user.

The restoration instruction program 1354 extracts a storage system identifier registered as the storage ID 2002 from the chosen entry. The extracted storage system identifier is the identifier of a storage system that has the data volume used by the application 1261 specified by the user.

The restoration instruction program 1354 then judges whether or not the storage system identifier extracted as the backup destination storage ID 7005 and the storage system identifier extracted as the storage ID 2002 are a match.

When it is judged in Step 15050 that the storage system that has the data volume used by the application 1261 specified by the user is the storage system that stores backup data at the specified recovery point, the restoration instruction program 1354 sends a command to the control program 1018 to copy data from the backup volume that stores backup data at the specified recovery point to the data volume with the use of the local copy restoration function (15060).

Upon completion of the data copy to the data volume, the restoration instruction program 1354 sends a command to the recovery manager 1262 to restart the application 1261 which has been stopped in Step 15040 (15070), and ends the restoration processing.

When it is judged in Step 15050 that the storage system that has the data volume used by the application 1261 specified by the user is not the storage system that stores backup data at the specified recovery point, the restoration instruction program 1354 sends a command to the control program 1018 to reverse the copy direction between the data volume and a mirrored volume that are used by the application 1261 specified by the user (15080). Data stored in the mirrored volume is thus copied to the data volume.

The restoration instruction program 1354 next sends a command to the control program 1018 of a storage system that has the mirrored volume to copy data from the backup volume that stores backup data at the specified recovery point to the mirrored volume with the use of the local copy restoration function (15090).

The restoration instruction program 1354 then stands by until the restored data is copied from the mirrored volume to the data volume (15100). In order to judge whether or not the data copy from the mirrored volume to the data volume has been completed, the restoration instruction program 1354 periodically checks with the control program 1018 about the progress of the copy.

After the data copy from the mirrored volume to the data volume is finished, the restoration instruction program 1354 sends a command to the control program 1018 to set the copy direction which has been reversed in Step 15080 such that data is copied from the data volume to the mirrored volume (15110), and then proceeds to Step 15070.

FIG. 16 is an explanatory diagram of the restoration target input console 16000 according to the first embodiment of this invention.

The restoration target input console 16000 has restoration target volumes 16001, a time axis 16002, at least one recovery point 16003, an "execute" button 16005, and a "cancel" button 16006.

The restoration target input console 16000 is a graph of which horizontal axis is the time axis 16002 and vertical axis shows the restoration target volumes 16001.

Backup data retention icons 16004 are displayed at the coordinates of the recovery point 16003 which is displayed on the time axis 16002 and the coordinates of the restoration target volumes 16001. To choose one of the backup data retention icons 16004, the user operates a pointing device such as a mouse pointer. The chosen backup data retention icon 16004 is highlighted. While one of the backup data retention icons 16004 is chosen, no other backup data retention icons 16004 can be selected.

When the user presses the "execute" button 16005, the restoration instruction program 1354 obtains backup data at the recovery point 16003 that is indicated by the chosen backup data retention icon 16004 as restoration target backup data, and then proceeds to Step 15040 of the restoration processing shown in FIG. 15. In the case where the user presses the "execute" button 16005 without choosing one of the backup data retention icons 16004, the restoration instruction program 1354 displays an error message to the user, and does not move to Step 15040.

When the user presses the "cancel" button 16006, the restoration instruction program 1354 removes the restoration target input console 16000 from the screen, and ends the restoration processing. The "cancel" button 16006 can be pressed only while the restoration instruction program 1354 is executing Step 15030.

According to this embodiment, degradation of the backup data retention period and of the RPO can be minimized in a remote copy environment when a disaster or the like causes a storage system to stop working normally. The cost can be minimized as well since the backup operation requires the minimum count of volumes.

Modification Example of First Embodiment

In the first embodiment, the user cannot specify how many generations of backed up data should be given redundancy. A modification example of the first embodiment deals with the management computer 1300 that enables the user to set how many generations of backed up data should be given redundancy.

For example, a backup volume of a generation immediately next to that of a backup volume that has obtained backup data is given redundancy, and the user specifies this count of generations given redundancy.

The description of the modification example of the first embodiment focuses on differences from the first embodiment.

The count of generations to be given redundancy is entered in the management computer 1300 through the backup condition registration console 9000 shown in FIG. 9. In the modification example, the backup condition registration console 9000 shown in FIG. 9 therefore has an additional field for inputting the count of generations to be given redundancy. The user enters a desired count of generations to be given redundancy in the redundant generation count input field.

In Step 8050 of the backup environment setting processing shown in FIG. 8, the setting program 1351 calculates Expression 4 to obtain a local copy pair generation count that is set to each storage system managed by the management computer 1300.

Local copy pair generation count=ROUNDUP(backup generation count/storage system count)+(redundant generation count)−ROUNDDOWN(redundant generation count/storage system count)  (Expression 4)

ROUNDDOWN (X) is a function that rounds down fractions of X

For instance, when the backup generation count is seven, the storage system count is two, and a redundant generation count entered by the user is two, the setting program 1351 obtains five as the local copy pair generation count by calculating ROUNDUP (7/2)+2−ROUNDDOWN (2/2).

Accordingly, backup operation having redundancy for as many generations as a generation count entered by the user can be executed if each storage system that obtains backup data has backup volumes for five or more generations.

Figure 17:
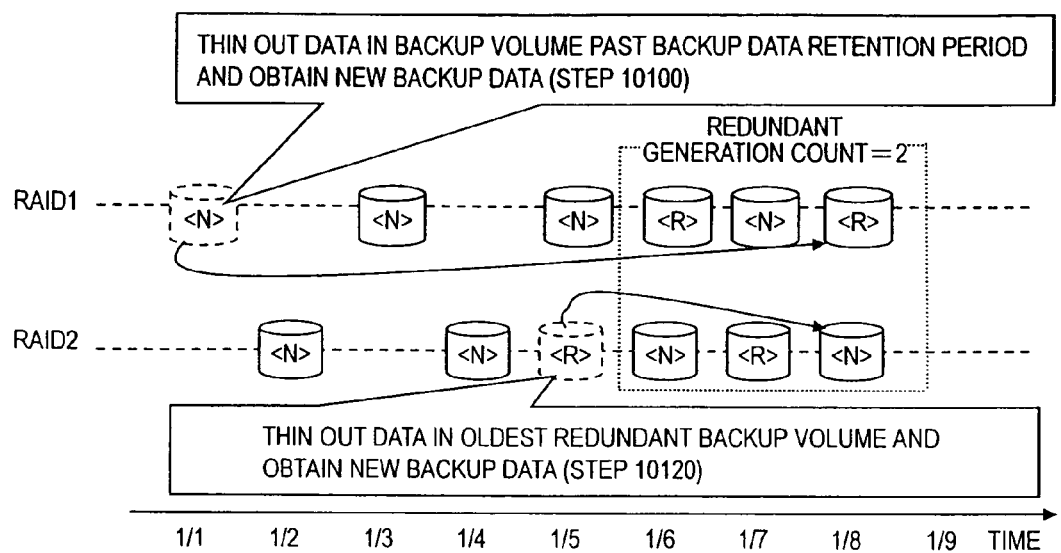
FIG. 17 is an explanatory diagram of a backup state when a backup instruction program executes backup processing according to the modification example of the first embodiment of this invention.

FIG. 17 is an explanatory diagram of a backup state when the backup instruction program 1352 executes backup processing according to the modification example of the first embodiment of this invention.

Described here is a case where the backup generation count is seven, the storage system count is two, a redundant generation count entered by the user is two, the RPO is set to one day, the backup data retention period is set to six days, and there are two backup data obtaining storage systems (RAID1 and RAID2). Backup volumes for five generations are set in each of the storage systems. The application 1261 for which data is backed up is "AP1".

In backup processing executed on January 8, RAID2 is chosen as the normal backup data obtaining storage system. RAID2 does not have an unused backup volume nor a backup volume that has passed the backup data retention period, but has a redundant volume (backup volume that has obtained backup data on January 5). In Step 10120 shown in FIG. 10, the backup instruction program 1352 accordingly backs up data stored in a mirrored volume in RAID2 that is associated with a data volume in RAID1 that is used by AP1 to this redundant volume.

RAID1, on the other hand, does not have an unused backup volume but has a backup volume that has passed the backup data retention period. The backup instruction program 1352 therefore backs up data stored in the data volume in RAID1 that is used by AP1 to this backup volume that has passed the backup data retention period in Step 10100.

The local copy pair generation count is a value calculated by Expression 4. In one of the storage systems (RAID1 of FIG. 17), a backup volume whose backup data obtained time is the oldest passes the backup data retention period, and the backup instruction program 1352 can back up data to this backup volume by thinning out data in the backup volume. In the other storage system (RAID2 of FIG. 17), the oldest redundant volume is a backup volume of four generations prior, and data is backed up to this backup volume by thinning out data stored in the backup volume.

In this way, backup operation can be performed while keeping the redundant backup volume generation count to two.

Second Embodiment

In a second embodiment of this invention, data stored in a data volume that is used by one application 1261 is copied to mirrored volumes in storage systems located on a plurality of remote sites.

Figure 18:
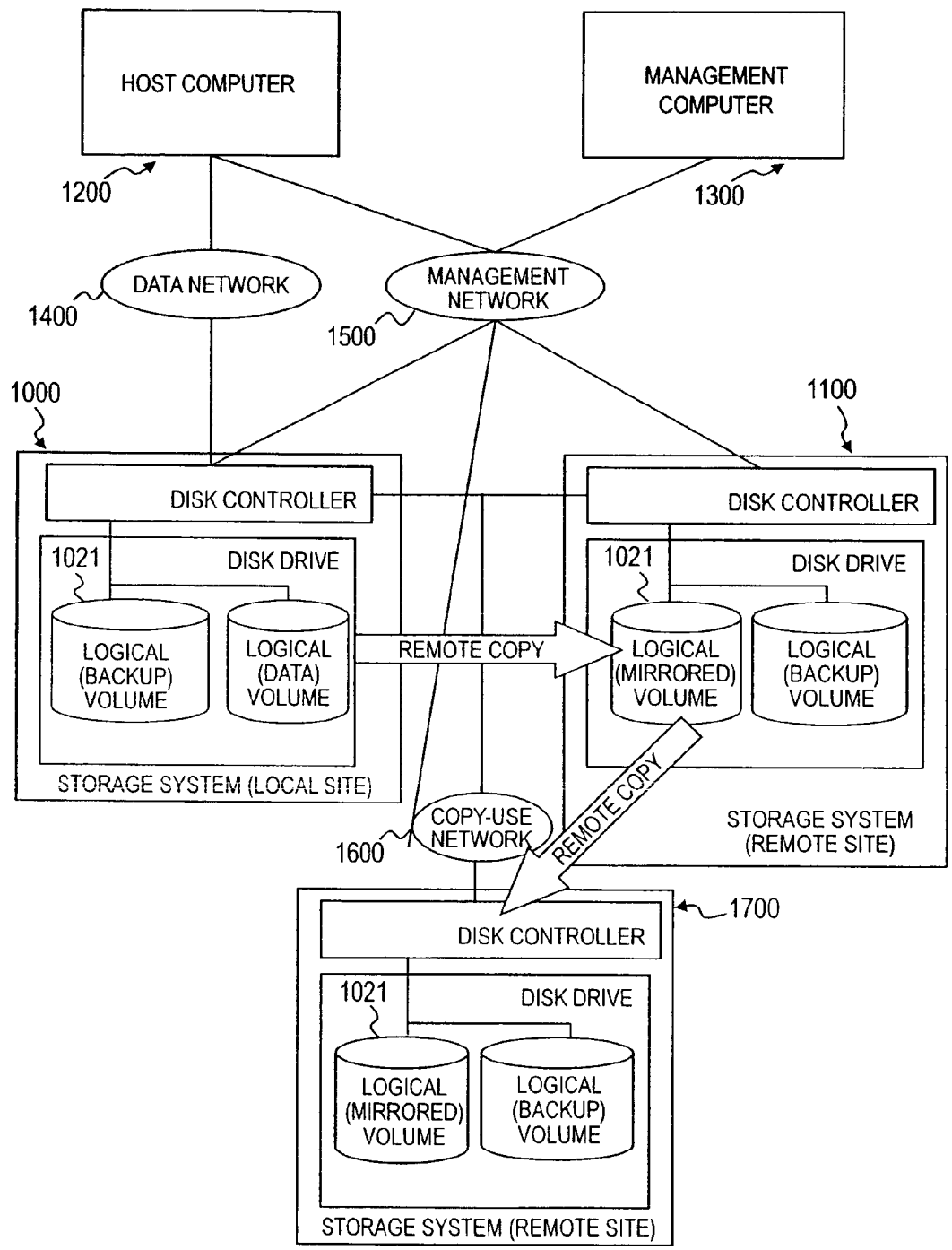
FIG. 18 is a block diagram showing a configuration of a computer system according to the second embodiment of this invention.

The second embodiment of this invention will be described with reference to FIG. 18. FIG. 18 is a block diagram showing the configuration of a computer system according to the second embodiment of this invention. Descriptions on components of the computer system in the second embodiment that are the same as those of the computer system 1000 in the first embodiment will be omitted.

The computer system has three storage systems denoted by 1000, 1100, and 1700.

Data stored in a data volume in the storage system 1000 is copied to a mirrored volume in the storage system 1100 by the remote copy function.

The data copied to the mirrored volume in the storage system 1100 is copied to a mirrored volume in the storage system 1700 by the remote copy function.

Backup operation can be performed also in the thus configured computer system by executing the same processing as in the first embodiment.

Modification Example of Second Embodiment

Figure 19:
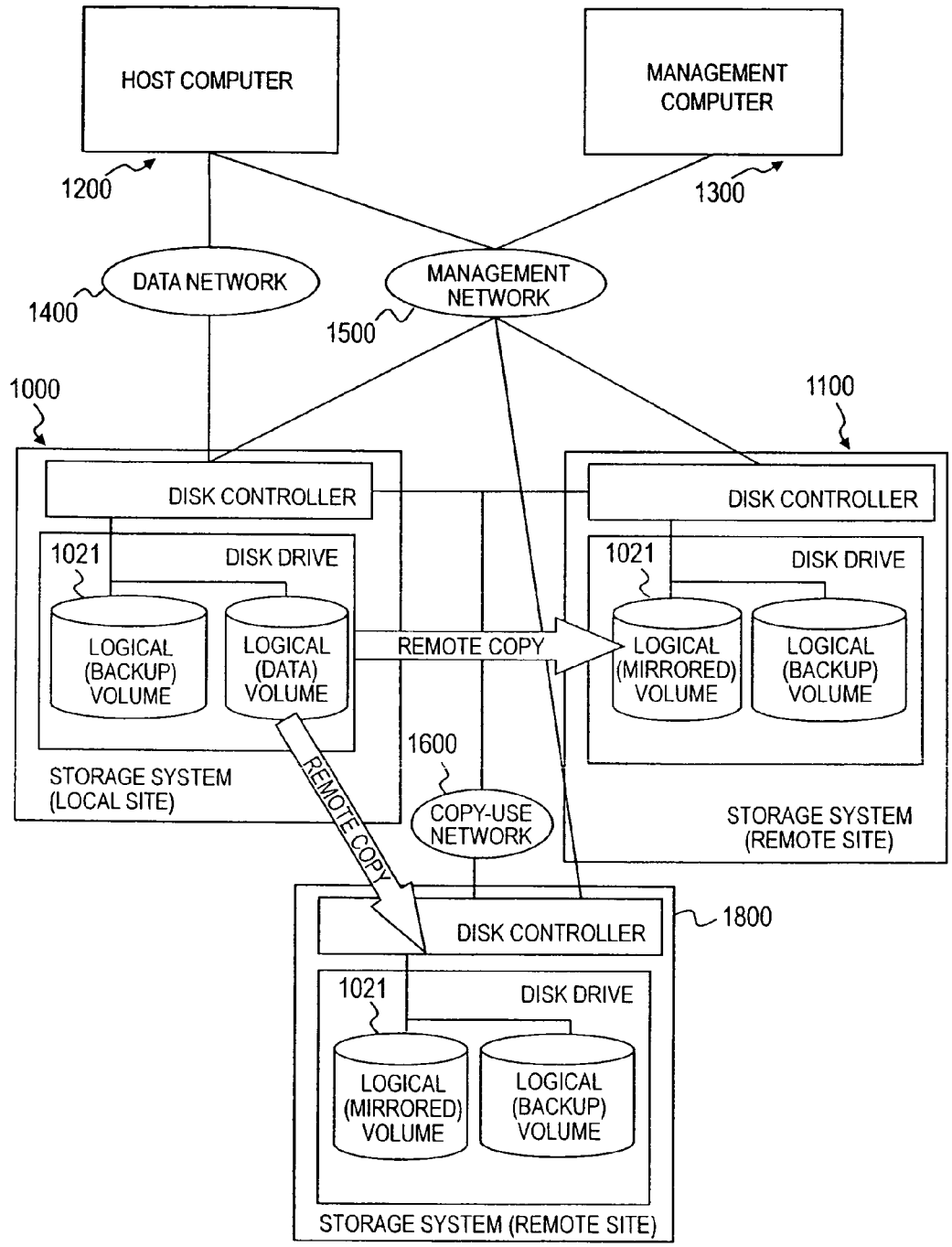
FIG. 19 is a block diagram showing a configuration of a computer system according to a modification example of the second embodiment of this invention.

A modification example of the second embodiment of this invention will be described with reference to FIG. 19. FIG. 19 is a block diagram showing the configuration of a computer system according to a modification example of the second embodiment of this invention. In this modification example, components shared with the second embodiment are denoted by the same reference numerals in order to omit their descriptions.

The computer system according to the modification example of the second embodiment has three storage systems, 1000, 1100, and 1800.

Data stored in a data volume in the storage system 1000 is copied to mirrored volumes in the storage systems 1100 and 1800 by the remote copy function.

Backup operation can be performed also in the thus configured computer system by executing the same processing as in the first embodiment.

The present invention can thus minimize degradation of the backup data retention period and of the RPO in a remote copy environment that has three or more sites when a disaster or the like causes a storage system to stop working normally. The cost can be minimized as well since the backup operation requires the minimum count of volumes.

Third Embodiment

Figure 20:
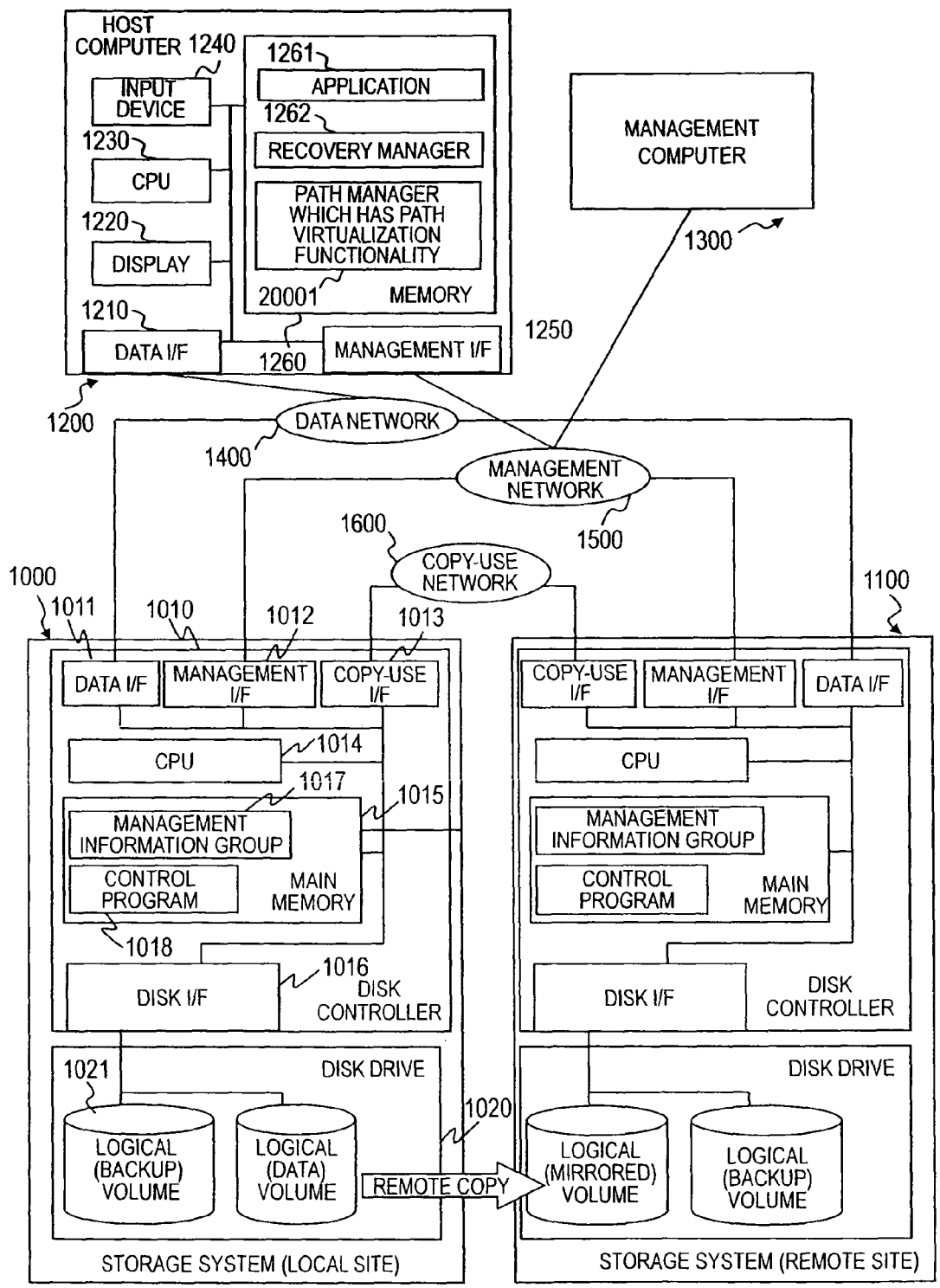
FIG. 20 is a block diagram showing a configuration of a computer system according to the third embodiment of this invention.

A third embodiment of this invention will be described with reference to FIGS. 20 and 21.

The configuration of a computer system according to the third embodiment will be described first with reference to FIG. 20. FIG. 20 is a block diagram showing the configuration of a computer system according to the third embodiment of this invention. In the third embodiment, descriptions on components shared with the first embodiment will be omitted.

The data I/F 1011 of the storage system 1100 on the remote site is coupled to the data network 1400.

The memory 1260 of the host computer 1200 stores a path manager 20001 which has path virtualization functionality. The path manager 20001 which has path virtualization functionality provides a virtual path from one application 1261 in the host computer 1200 to a data volume that is used by the application 1261.

When the application 1261 accesses the data volume through the virtual path, the path manager 20001 which has path virtualization functionality converts the virtual path to the accessed data volume into a real path to the data volume.

In the case where the storage system on the local site stops working normally due to a failure, the path manager 20001 which has path virtualization functionality converts access to a data volume in this storage system through a virtual path into access to a mirrored volume. This allows the application 1261 to write data in the mirrored volume, and thereby continue its task without being affected by the failure in the storage system on the local site.

A description on processing according to the third embodiment will be given below focusing on differences from the first embodiment.

Figure 21:
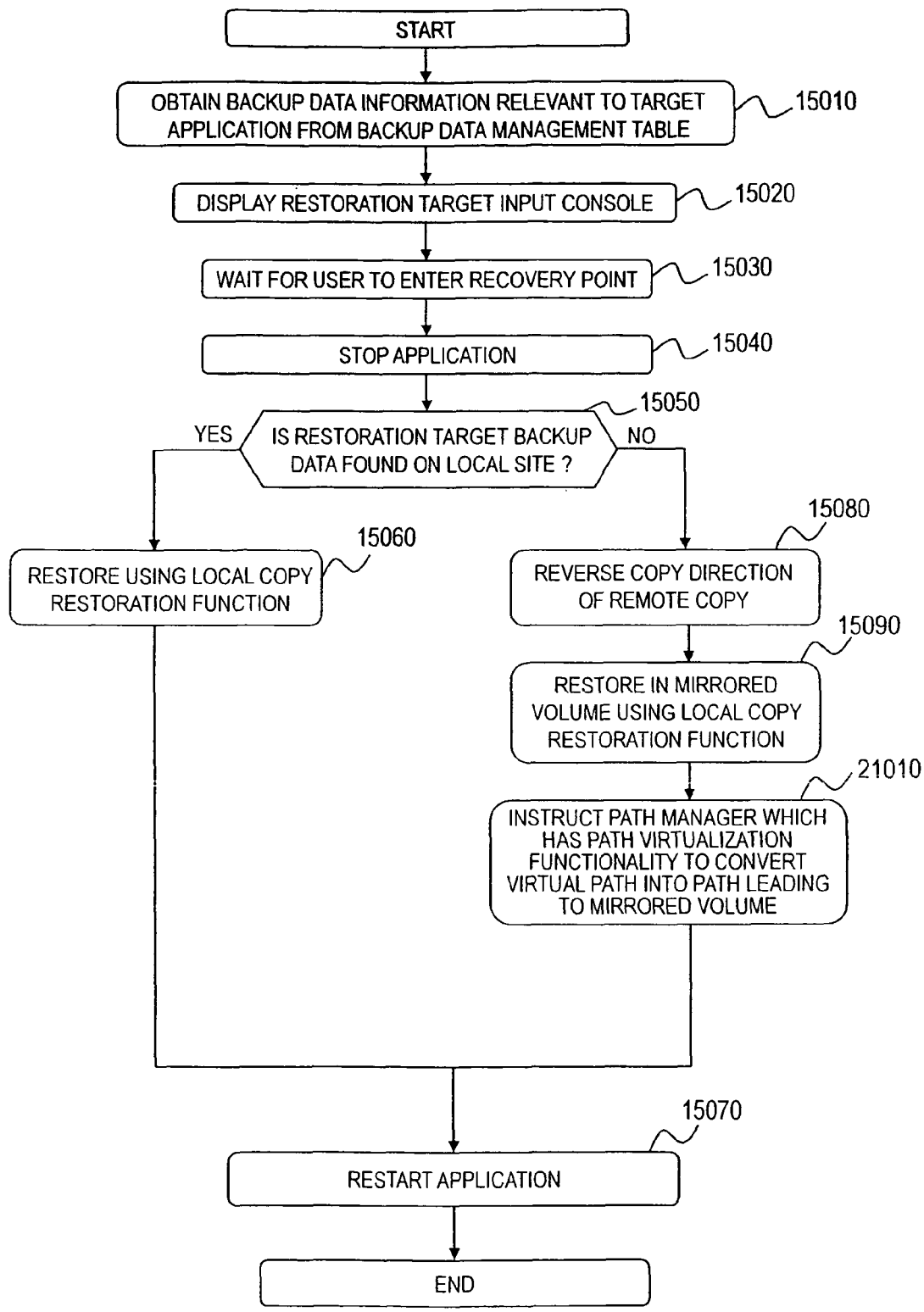
FIG. 21 is a flow chart of restoration processing executed by a restoration instruction program according to the third embodiment of this invention.

FIG. 21 is a flow chart of restoration processing executed by the restoration instruction program 1354 according to the third embodiment of this invention. Steps in FIG. 21 that correspond to the steps of the restoration processing described in the first embodiment with reference to FIG. 15 are denoted by the same reference numerals, and their descriptions will be omitted.

In Step 21010, the restoration instruction program 1354 sends a command to the path manager 20001 which has path virtualization functionality to convert access from the application 1261 to the data volume through a virtual path into access to a path to a mirrored volume. The restoration instruction program 1354 does not need to wait for the completion of the remote copy to send a command to restart the application 1261 to the recovery manager 1262 (15070).

Since the operation of the application 1261 can be resumed before the remote copy is completed, the task recovers quickly.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
    a host computer which has a first processor, a memory, and a first interface, the first processor performing computing, the memory being coupled to the first processor and storing an application program which performs a task, the first interface being coupled to the first processor;
    a first storage system which has a second processor, a first storage device, and a second interface, the second processor performing computing, the first storage device including a data volume which stores data requested by the application program to be written, the second interface being coupled to the second processor;
    at least one second storage system which has a third processor, a second storage device, and a third interface, the third processor performing computing, the second storage device including a mirrored volume which stores a copy of the data stored in the data volume, the third interface being coupled to the third processor; and
    a management computer which has a fourth processor, a memory, and a fourth interface, the fourth processor performing computing, the memory being coupled to the fourth processor, the fourth interface being coupled to the fourth processor,
    wherein the first storage device includes a plurality of backup volumes where backup processing for copying the data stored in the data volume is executed,
    wherein the second storage device of each of the at least one second storage system includes a plurality of backup volumes where backup processing for copying the data stored in the mirrored volume is executed,
    wherein the management computer is configured to receive an input of a policy about the backup processing executed in the backup volumes, set a configuration of the first storage device and a configuration of the second storage device of each of the at least one second storage system under the received policy, and execute the backup processing in the plurality of backup volumes included in the first storage device and the plurality of backup volumes included in the second storage device of each of the at least one second storage system according to the set configuration of the first storage device and the set configuration of the second storage device of each of the at least one second storage system, wherein the management computer is configured to, upon determining that the first storage device includes at least one redundant volume that stores data of which at least one other copy exists in the first storage system during execution of the backup processing in the plurality of backup volumes included in the first storage device, take a backup by copying data stored in the data volume to a selected one of the at least one redundant volume of the first storage system as a backup destination volume, and wherein the management computer is configured to, upon determining that the second storage device of any of the at least one second storage system includes at least one redundant volume that stores data of which at least one other copy exists in the second storage system during execution of the backup processing in the plurality of backup volumes included in the second storage device, take a backup by copying data stored in the mirrored volume of the second storage device to a selected one of the at least one redundant volume of the second storage system as a backup destination volume.

2. The computer system according to claim 1, wherein the policy includes backup timing information which indicates when to execute the backup processing, and wherein the management computer is configured to execute the backup processing at each backup timing for one storage system at a time, moving from one storage system to the next storage system in sequential order.

3. The computer system according to claim 2, wherein the policy further includes backup data storage period information which indicates how long the copied data is to be stored in the backup volumes since the backup processing is executed, and wherein, the management computer is configured to delete, in a case where there is a backup volume storing data that has passed the backup data storage period, the data from this backup volume and then executes the backup processing in this backup volume.

4. The computer system according to claim 2, wherein the policy includes backup data storage period information and a trouble operation policy, the backup data storage period information indicating how long the copied data is to be stored in the backup volumes since the backup processing is executed, the trouble operation policy indicating which of the backup timing and the backup data storage period is to be given priority in storing copied data in the backup volumes in a case where one of the first storage system and the at least one second storage system is not working normally, and wherein the management computer is configured to:
execute, in a case where the trouble operation policy indicates that the backup timing is to be given priority, the backup processing at the each backup timing in backup volumes included in the storage system that is working normally; and
execute, in a case where the trouble operation policy indicates that the backup data storage period is to be given priority, the backup processing in backup volumes included in the storage system that is working normally at a timing when backup processing should be executed for this storage system.

5. The computer system according to claim 1, wherein the management computer is configured to:

receive an input specifying a timing when data used to repair destroyed data in the data volume is copied to one backup volume;
identify the backup volume where the backup processing has been executed at a timing that matches the specified timing;
repair, in a case where the identified backup volume is included in the first storage system, data stored in the data volume by copying data from the identified backup volume to the data volume; and
repair, in a case where the identified backup volume is included in one of the at least one second storage system, data stored in the data volume by copying data from the identified backup volume to the mirrored volume of the second storage system and then copying the copied data from the mirrored volume to the data volume.

6. The computer system according to claim 5, wherein the host computer is configured to:
set a data path from the application program to the data volume in order to enable the application program to write data in the data volume; and
convert, in a case where the management computer copies data from the identified backup volume to the mirrored volume of the one of the at least one second storage system, the data path leading from the application program to the data volume into a data path leading from the application program to the mirrored volume, wherein data requested by the application program to be written is stored in the mirrored volume.

7. The computer system according to claim 1, wherein the management computer is further configured to display a backup data retention state indicating where backup data is stored in each of the storage systems over a time period.

8. A management computer that has access to a host computer, a first storage system, and at least one second storage system, the host computer running an application program which performs a task, the first storage system being coupled to the host computer and including a data volume which stores data requested by the application program to be written, the at least one second storage system including a mirrored volume to which the data stored in the data volume is copied, wherein the first storage system includes a plurality of backup volumes where backup processing for copying the data stored in the data volume is executed,
wherein the at least one second storage system includes a plurality of backup volumes where backup processing for copying the data stored in the mirrored volume is executed, and
wherein the management computer is configured to:
receive an input of a policy about the backup processing executed in the backup volumes;
set a configuration of the first storage system and a configuration of the at least one second storage system under the received policy;
execute the backup processing in the plurality of backup volumes included in the first storage system and the plurality of backup volumes included in the at least one second storage system according to the set configuration of the first storage system and the set configuration of the at least one second storage system;
upon determining that the first storage system includes at least one redundant volume that stores data of which at least one other copy exists in the first storage system during execution of the backup processing in the plurality of backup volumes included in the first storage system, take a backup by copying data stored in the data volume to a selected one of the at least one redundant volume of the first storage system as a backup destination volume; and upon determining that the at least one second storage system includes at least one redundant volume that stores data of which at least one other copy exists in the at least one second storage system during execution of the backup processing in the plurality of backup volumes included in the at least one second storage system, take a backup by copying data stored in the mirrored volume of the at least one second storage system to a selected one of the at least one redundant volume of the at least one second storage system as a backup destination volume.

9. The management computer according to claim 8, wherein the policy includes backup timing information which indicates when to execute the backup processing, and wherein the management computer is configured to execute the backup processing at each backup timing for one storage system at a time, moving from one storage system to the next storage system in order.

10. The management computer according to claim 9, wherein the policy includes backup data storage period information and a trouble operation policy, the backup data storage period information indicating how long the copied data is to be stored in the backup volumes since the backup processing is executed, the trouble operation policy indicating which of the backup timing and the backup data storage period is to be given priority in storing copied data in the backup volumes in a case where one of the first storage system and the at least one second storage system is not working normally, and wherein the management computer is configured to:

execute, in a case where the trouble operation policy indicates that the backup timing is to be given priority, the backup processing at each backup timing in backup volumes included in the storage system that is working normally; and execute, in a case where the trouble operation policy indicates that the backup data storage period is to be given priority, the backup processing in backup volumes included in the storage system that is working normally at a timing when backup processing should be executed for this storage system.

11. The management computer according to claim 8, wherein the policy further includes backup data storage period information which indicates how long the copied data is to be stored in the backup volumes since the backup processing is executed, and wherein, the management computer is configured to delete, in a case where there is a backup volume storing data that has passed the backup data storage period, the data from this backup volume and then executes the backup processing in this backup volume.

12. The management computer according to claim 8, wherein the management computer is configured to:

receive an input specifying a timing when data used to repair destroyed data in the data volume is copied to one backup volume;

identify the backup volume where the backup processing has been executed at a timing that matches the specified timing;

repair, in a case where the identified backup volume is included in the first storage system, data stored in the data volume by copying data from the identified backup volume to the data volume; and repair, in a case where the identified backup volume is included in the at least one second storage system, data stored in the data volume by copying data from the identified backup volume to the mirrored volume and then copying the copied data from the mirrored volume to the data volume.

13. The management computer according to claim 12, wherein the host computer sets a data path from the application program to the data volume in order to enable the application program to write data in the data volume, and wherein, the management computer is configured to send, in a case where data is copied from the identified backup volume to the mirrored volume, an instruction to the host computer to convert the data path leading from the application program to the data volume into a data path leading from the application program to the mirrored volume so that data requested by the application program to be written is stored in the mirrored volume.

14. The management computer according to claim 8, wherein the management computer is further configured to display a backup data retention state indicating where backup data is stored in each of the storage systems over a time period.

* * * * *